United States Patent [19]

Miura

[11] Patent Number: 5,689,647
[45] Date of Patent: Nov. 18, 1997

[54] PARALLEL COMPUTING SYSTEM WITH PROCESSING ELEMENT NUMBER SETTING MODE AND SHORTEST ROUTE DETERMINATION WITH MATRIX SIZE INFORMATION

[75] Inventor: Hiroki Miura, Osaka-fu, Japan

[73] Assignee: Sanyo Electric Co., Ltd., Osaka-fu, Japan

[21] Appl. No.: 551,694

[22] Filed: Nov. 1, 1995

Related U.S. Application Data

[63] Continuation of Ser. No. 370,459, Jan. 9, 1995, abandoned, which is a continuation of Ser. No. 67,268, May 24, 1993, abandoned, which is a continuation of Ser. No. 492,680, Mar. 13, 1990, abandoned.

[30] Foreign Application Priority Data

| Mar. 14, 1989 | [JP] | Japan | 1-63091 |
| Mar. 14, 1989 | [JP] | Japan | 1-63092 |
| Jun. 15, 1989 | [JP] | Japan | 1-153276 |
| Jun. 15, 1989 | [JP] | Japan | 1-153277 |
| Oct. 13, 1989 | [JP] | Japan | 1-266624 |
| Oct. 13, 1989 | [JP] | Japan | 1-266625 |
| Oct. 13, 1989 | [JP] | Japan | 1-266626 |

[51] Int. Cl.⁶ ............................................. G06F 15/173
[52] U.S. Cl. ............. 395/200.15; 364/131; 364/133; 364/180; 395/200.02; 395/200.17; 395/851
[58] Field of Search ................... 395/200.02, 200.15, 395/200.17, 851; 364/131, 133, 180

[56] References Cited

U.S. PATENT DOCUMENTS

| 4,660,141 | 4/1987 | Ceccon et al. | 395/829 |
| 4,816,993 | 3/1989 | Takahashi et al. | 395/250 |
| 4,884,193 | 11/1989 | Lang | 395/800 |
| 4,891,751 | 1/1990 | Call et al. | 395/800 |
| 4,891,787 | 1/1990 | Gifford | 395/375 |
| 4,891,810 | 1/1990 | de Corlieu et al. | 371/9.1 |
| 4,905,143 | 2/1990 | Takahashi et al. | 395/800 |
| 4,922,418 | 5/1990 | Dolecek | 395/185.04 |
| 4,942,517 | 7/1990 | Cok | 395/800 |
| 4,943,916 | 7/1990 | Asano et al. | 395/775 |
| 4,964,032 | 10/1990 | Smith | 395/800 |
| 4,964,038 | 10/1990 | Louis et al. | 395/829 |
| 4,984,235 | 1/1991 | Hillis et al. | 370/60 |
| 4,985,832 | 1/1991 | Gondalski | 395/800 |
| 4,992,933 | 2/1991 | Taylor | 395/800 |
| 5,021,947 | 6/1991 | Campbell et al. | 395/700 |
| 5,058,001 | 10/1991 | Li | 395/500 |
| 5,105,424 | 4/1992 | Flaig et al. | 370/94.1 |

*Primary Examiner*—Kenneth S. Kim
*Attorney, Agent, or Firm*—Darby & Darby

[57] ABSTRACT

A parallel computer system includes a plurality of processing elements each including a network control unit and a data processing unit. The network control unit of each processing element includes a north, east, west and south ports to each of which a row and column communication lines are connected so as to construct a torus mesh network. A specific mode flag which is set by a reset signal from a host computer coupled to the network and a number register are formed in the data processing unit. If a packet is sent to the network from the host computer when the specific mode flag is set, in the processing element which received the packet, the processing element number included in the packet is set in the number register and the specific mode flag is reset so that the processing element can be identified by that processing element number in a normal mode. In the normal mode, the packet is inputted to the data processing unit when the processing element number of the packet is coincident with its own processing element number. If not coincident, the packet is outputted to a port determined by a predetermined algorithm so that the packet can be transferred to an addressed processing element on the network with the shortest distance.

44 Claims, 18 Drawing Sheets

FIG. 4

22  PROGRAM STORAGE (PS)

| 31 | 29 | 26 | 20 | | 9 | 4 | 3 | 2 | 1 | 0 |
|---|---|---|---|---|---|---|---|---|---|---|
| 0 | MODE | S-CODE | OPCODE-S | NODE # | | OPCODE-M | – | – | 0 | 1 |
| 0 | MODE | S-CODE | OPCODE-S | NODE # | | OPCODE-M | – | – | 1 | 1 |
| CONSTANT DATA ||||||||||||
| 1 | MODE | S-CODE | PE # | NODE # | | OPCODE-M | – | – | 0 | 0 |

EX (bit 29)    26    16    9    4    CONST COPY (bits 1,2)

FIG. 5

24    FIRING CONTROL & COLOR MANAGEMENT (FCCM)

| | 49         18 | 10 9 | 8 | 7 | 0 | |
|---|---|---|---|---|---|---|
| 0   | DATA (32 BITS) | TAG | LR | FE | NX | POINTER |
| 1   | DATA (32 BITS) | TAG | LR | FE | NX | POINTER |
| ⋮   |                |     |    |    |    |         |
| 127 | DATA (32 BITS) | TAG | LR | FE | NX | POINTER |
| 128 | DATA (32 BITS) | TAG | LR | FE | NX | POINTER |
| 129 | DATA (32 BITS) | TAG | LR | FE | NX | POINTER |
| ⋮   |                |     |    |    |    |         |
| 254 | DATA (32 BITS) | TAG | LR | FE | NX | POINTER |
| 255 | DATA (COLOR)   | TAG | LR | FE | NX | POINTER |

Rows 0–127: HASH
Rows 128–254: BUFFER

18 NETWORK CONTROL (NC)

○ JOINING
◉ BRANCHING

FIG. 10  42 SELF-SYNCHRONIZING SHIFT REGISTER

FIG. 15A

| 1 | OTHER INFORMATION | LOAD ADDRESS | (HEADDER) |
|---|---|---|---|
| 0 | LOAD DATA | | (TAIL) |

FIG. 15B

| 1 | HEADDER b |
|---|---|
| 0 | REGISTER SETTING DATA |

FIG. 15C

| 1 | HEADDER c |
|---|---|
| 0 | n (VECTOR LENGTH-1) |

FIG. 15D

| 1 | HEADDER d (INSTRUCTION CODE = "x") | |
|---|---|---|
| 0 | sdx1 | sdy1 |

LEFT OPERAND — RIGHT OPERAND

FIG. 15E

| 1 | HEADDER e (INSTRUCTION CODE = "−") | |
|---|---|---|
| 0 | sdx2 | sdy2 |

FIG.16

EDM 40

| Address | Value |
|---|---|
| XA0 | x0 |
| XA0+1 | x1 |
| XA0+2 | x2 |
| ⋮ | ⋮ |
| XA0+n | xn |
| ⋮ | ⋮ |
| YA0 : | y0 |
| YA0+1: | y1 |
| YA0+2: | y2 |
| ⋮ | ⋮ |
| YA0+n | yn |

FIG.17

EDM 40

| Address | Value |
|---|---|
| XA0 | x0 |
| XA0+1 | x1 |
| XA0+2 | x2 |
| ⋮ | ⋮ |
| XA0+n | xn |
| ⋮ | ⋮ |
| YA0 : | y0 |
| YA0+1: | y1 |
| YA0+2: | y2 |
| ⋮ | ⋮ |
| YA0+n | yn |
| ⋮ | ⋮ |
| ZA0 : | x0+y0 |
| ZA0+1: | x1+y1 |
| ZA0+2: | x2+y2 |
| ⋮ | ⋮ |
| ZA0+n | xn+yn |

PARALLEL COMPUTING SYSTEM WITH PROCESSING ELEMENT NUMBER SETTING MODE AND SHORTEST ROUTE DETERMINATION WITH MATRIX SIZE INFORMATION

This is a continuation of application Ser. No. 08/370,459, filed Jan. 9, 1995, now abandoned, which in turn is a continuation of application Ser. No. 08/067,268, filed May 24, 1993, now abandoned, which in turn is a continuation of application Ser. No. 07/492,680 filed Mar. 13, 1990, now abandoned.

BACKGROUND OF THE INVENTION

1. Field of the Invention

The present invention relates to a parallel computer system including processing elements. More specifically, the present invention relates to a parallel computer system which is provided with a plurality of processing elements and data is sent and received between the processing elements in accordance with a processing element number assigned to each processing element.

2. Description of the Prior Arts

Recently, researches are advanced toward realization of a practical parallel computer. Especially, as advancement of a semiconductor technology, there are researches in which a communication control unit and a data processing unit are implemented as a processing element of a single-chip LSI and a large number of such processing element LSIs are connected to realize a parallel computer.

For example, in a parallel computer disclosed in pages 181–218 of "Nikkei Electronics" issued on Apr. 9, 1984, a data communication system in which a plurality of single-chip processing elements, called an ImPP (Image Pipelined Processor), are connected in a ring manner to send and receive the data.

In addition, as disclosed in pages 1048–1049 of a collection of papers 2T-2 for the 38th national meeting (the first half year in 1989) of the Information Processing Society, the inventors discuss development of a large-scale parallel data driven computer EDDEN (Enhanced Data Driven Engine) wherein a maximum of 1024 processing elements, each of which is incorporated in a single chip, are connected.

In such a parallel computer, generally, a processing element number is assigned to each of the processing elements to identify respective processing elements and the number (addressing number) of the processing element to which communication data is to be sent is added to the communication data. In each processing element, the addressing number included in the communication data arrived at a network control unit and its own processing element number are compared with each other and, if the both are coincident with each other, the communication data is fetched in a data processing unit.

In order to implement a data communication system in such a parallel computer, first, it is necessary to provide a function for setting processing element numbers into respective processing elements. For example, in the aforementioned processing element called as ImPP, a method in which a module number indicated by 4 bits is set by means of a module setting buffer externally connected to the LSI is adopted (see FIG. 14 in page 206 of "Nikkei Electronics").

In such a case, since pins for data signals of the LSI are also used for setting the module number, it is necessary to connect an external circuit including a tri-state buffer, dip or other similar device to each of the processing element chips. However, in each processing element chip, it is possible to separately provide pins for setting the module number and pins for data signals. In this case, the above described tri-state buffer becomes unnecessary, but the total number of pins of the processing element LSI increases.

However, in the parallel computer system in which a large number of processing elements are connected as in the aforementioned EDDEN, since a size of an LSI package of one processing element, a scale of the external circuit and etc. have a great influence on a size of the whole system, it is desired that the total number of pins of the LSI is made small and the scale of the external circuit is miniaturized as much as possible.

In addition, in the above described method wherein the processing element number is directly set from the outside to each of the processing element LSIs, if a change of the processing element number is needed, all the DIP switches corresponding to all the processing elements must be operated to change the processing element numbers, and thus, an extensive amount of work becomes necessary.

OBJECTS OF THE INVENTION

Therefore, a principal object of the present invention is to provide a novel parallel computer system using a plurality of processing elements.

Another object of the present invention is to provide a parallel computer system in which it is possible to simply set processing element numbers to processing elements.

Another object of the present invention is to provide a parallel computer system in which change of processing element numbers being set in processing elements is easy.

Another object of the present invention is to provide a parallel computer system in which it is possible to efficiently transfer data on a network.

Another object of the present invention is to provide a parallel computer system in which it is possible to transfer data to an addressed processing element through a path of the shortest distance.

Another object of the present invention is to provide a parallel computer system in which it is possible to efficiently transfer data to a host computer.

Another object of the present invention is to provide a parallel computer system of a low cost.

Another object of the present invention is to provide a parallel computer system in which it is possible to utilize the same LSI as not only a processing element but also an interface.

Another object of the present invention is to provide a data transfer system using a self-synchronous shift register and capable of flexibly dealing with variations of data flows.

The other object of the present invention is to provide a data-driven data processing apparatus capable of efficiently performing a vector operation.

SUMMARY OF THE INVENTION

A parallel computer system in accordance with the present invention comprises: a plurality of processing elements, said plurality of elements respectively including network control units and data processing units and capable of being selectively set as a first mode or a second mode; a communication line for coupling a plurality of said network control units to construct a network; sending means for sending data including a processing element number onto the communication line; number holding means provided in each of the plurality of processing elements for holding a processing element number; and number setting means provided in each of the plurality of processing elements for setting the processing element number included in said data into the number holding means when said data is sent onto the communication line in said first mode.

For example, in response to a hardware reset signal from a host computer, each processing element is set in the first mode by means of mode indicating means such as a mode flag. The first mode is a specific mode for setting processing element numbers into respective processing elements. The mode flag is reset when the processing element number is set into the processing element and the processing element is set in the second mode, that is, a normal mode. When a packet including processing element number is sent onto the communication line, that is, network from the host computer coupled to the network in the first mode, in the processing element being set in the first (specific) mode, the packet is fetched irrespective of instructions included in the packet, and the processing element number included in a received packet is set in the number holding means such as a number register. At that time, the mode flag is reset so that the processing element is changed into the second mode.

In accordance with the above described parallel computer system, it is extremely easy to set the processing element numbers into the respective processing elements. More specifically, since in each processing element, the number data is fetched automatically when its own processing element number has not been set, by only sending the number data from the host computer, the processing element number can be set. Therefore, in comparison with a case where circuit elements are used as in the conventional ImPP, only a few additional circuit may be provided and a complex working such as an operation of a large number of dip switches is unnecessary, and therefore, the processing element numbers can be set easily.

A parallel computer system in accordance with the present invention comprises: a plurality of processing elements, said plurality of processing elements respectively including network control units and data processing units, said network control unit including a plurality of ports; a communication line for coupling the ports of a plurality of said network control units to construct a network; and routing means provided in each network control unit to determine a port through which data is to be outputted so that data outputted from said data processing unit or data transferred to a port from another processing element can be transferred to an objective processing element over the shortest distance.

Data includes an addressing processing element number indicative of that the data is to be received by what processing element, and the routing means includes means for calculating a difference between said addressing processing element number and the processing element number held in the number holding means such as a number register. If the plurality of processing elements are arranged in a form of a mesh network, the processing element number composed of a row direction number and a column direction number, and thus, said means for calculating a difference includes means for calculating a difference of the row direction numbers and means for calculating a difference of the column direction numbers. In addition, the plurality of processing elements are arranged in a form of a torus mesh network, the means for calculating a difference of the row direction numbers and the means for calculating a difference of the column direction numbers include modulo operation means, respectively.

By providing such routing means, the transfer of the data on the network can be performed very efficiently.

As a data transfer line such as an input/output register provided at each port of the network control unit, a novel data transfer system in accordance with the present invention can be utilized.

A packet transfer system where a packet in which a plurality of words each including data of a predetermined bits and a transfer control bit of i bit are sequentially arranged is transferred word by word, said transfer control bit being alternately set as "1" or "0" word by word, said packet transfer system comprises: a plurality of parallel latch means each having the bit number corresponding to a word of said packet, said plurality of parallel latch means being connected in a cascade fashion; clock means for alternately applying two clock signals having opposite phases to said plurality of latch means; comparing means for comparing respective transfer control bits of words latched in adjacent parallel latch means; and control means for enabling or disabling the clock signals given to the parallel latch means in response to an output of the comparing means.

The data transfer system can deal with variations of a data flow without using a complex simultaneously operating stopping circuit and simultaneously operating stop releasing circuit or the like.

In addition, the present invention can be implemented as a parallel computer system using a data-driven data processing apparatus set forth in the following description.

A data-driven data processing apparatus which executes a data flow graph as a program, comprises: a pipeline ring to transfer a packet; instruction execution means arranged on the pipeline ring for executing instruction in accordance with said packet; vector data storing means for storing vector data including element data; and vector operation control means connected to said instruction execution means for repeatedly executing the same operation with respect to said element data of the vector data read from the vector data storing means when a vector operation packet designating a vector operation is inputted to the instruction execution means.

In the data-driven data processing apparatus, it is possible to easily and efficiently execute a vector operation in which the conventional data-driven processing apparatus was weak.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 4 is an illustrative view showing one example of a memory format of a program storage (PS) shown in FIG. 2.

FIG. 5 is an illustrative view showing a memory format of a filing control and color management unit (FCCM) shown in FIG. 2.

FIGS. 15A, 15B, 15C, 15D, and 15E are illustrative views respectively showing formats of different packets used in an embodiment shown in FIGS. 13 and 14.

FIGS. 16 and 17 are illustrative views respectively showing examples of memory formats of an external data memory (EDM).

DETAIL DESCRIPTION OF THE PREFERRED EMBODIMENTS

Figure 1:
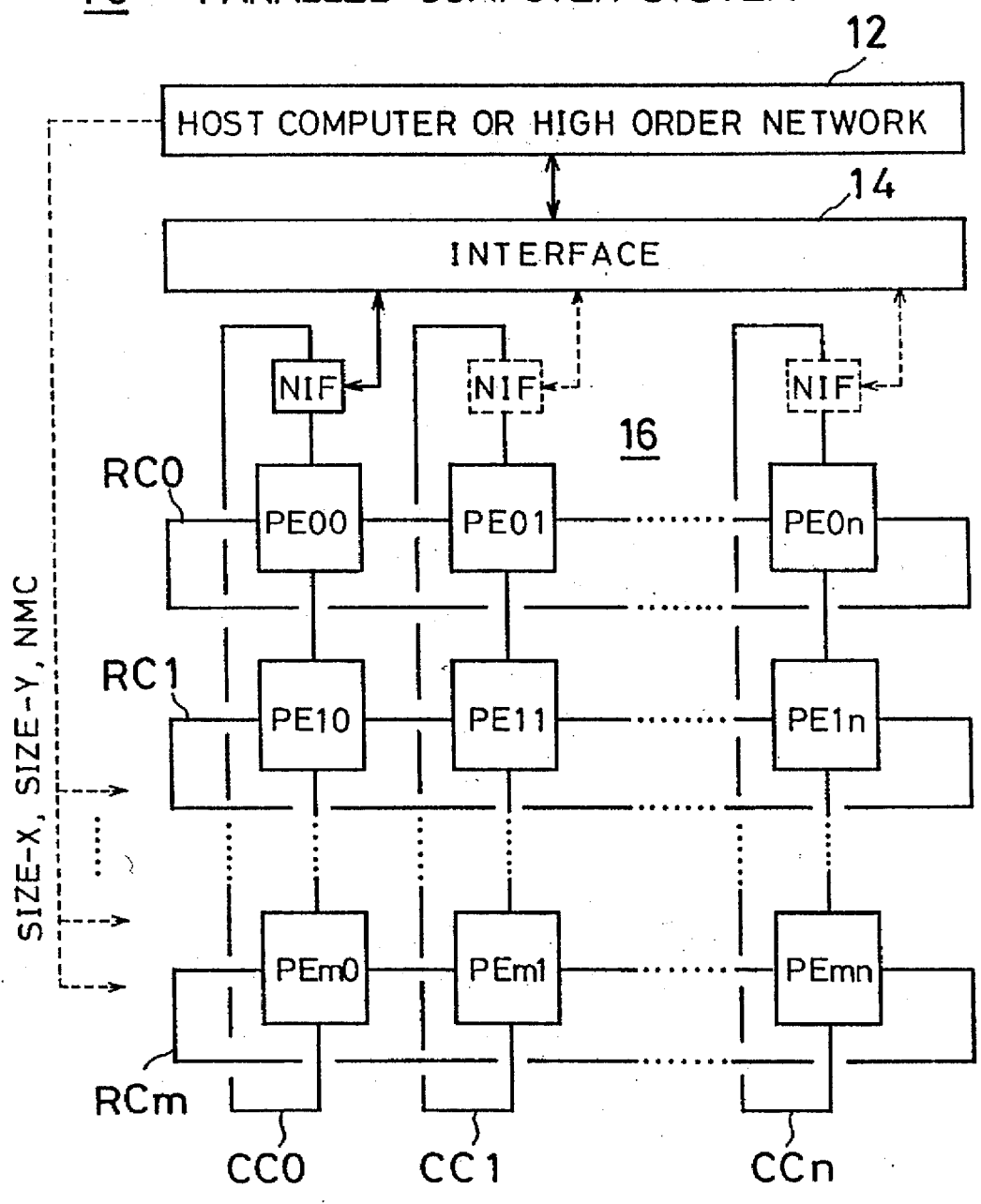
FIG. 1 is a block diagram showing a data-driven parallel computer as one embodiment in accordance with the present invention.

FIG. 1 is a block diagram showing a data-driven parallel computer system as one embodiment in accordance with the present invention. In the following, a description will be made in a case where the present invention is applied to a data-driven parallel computer system, but it is pointed out in advance that the present invention can be also applied to a parallel computer system other than a data-driven type unless otherwise referred to.

With reference to FIG. 1, a parallel computer system 10 of this embodiment shown includes a host computer (this may be a high-level network) 12, and the host computer (or the high-level network) 12 is coupled to a network 16 through an interface 14. The interface 14 is a bus interface or a cluster interface.

Figure 2:
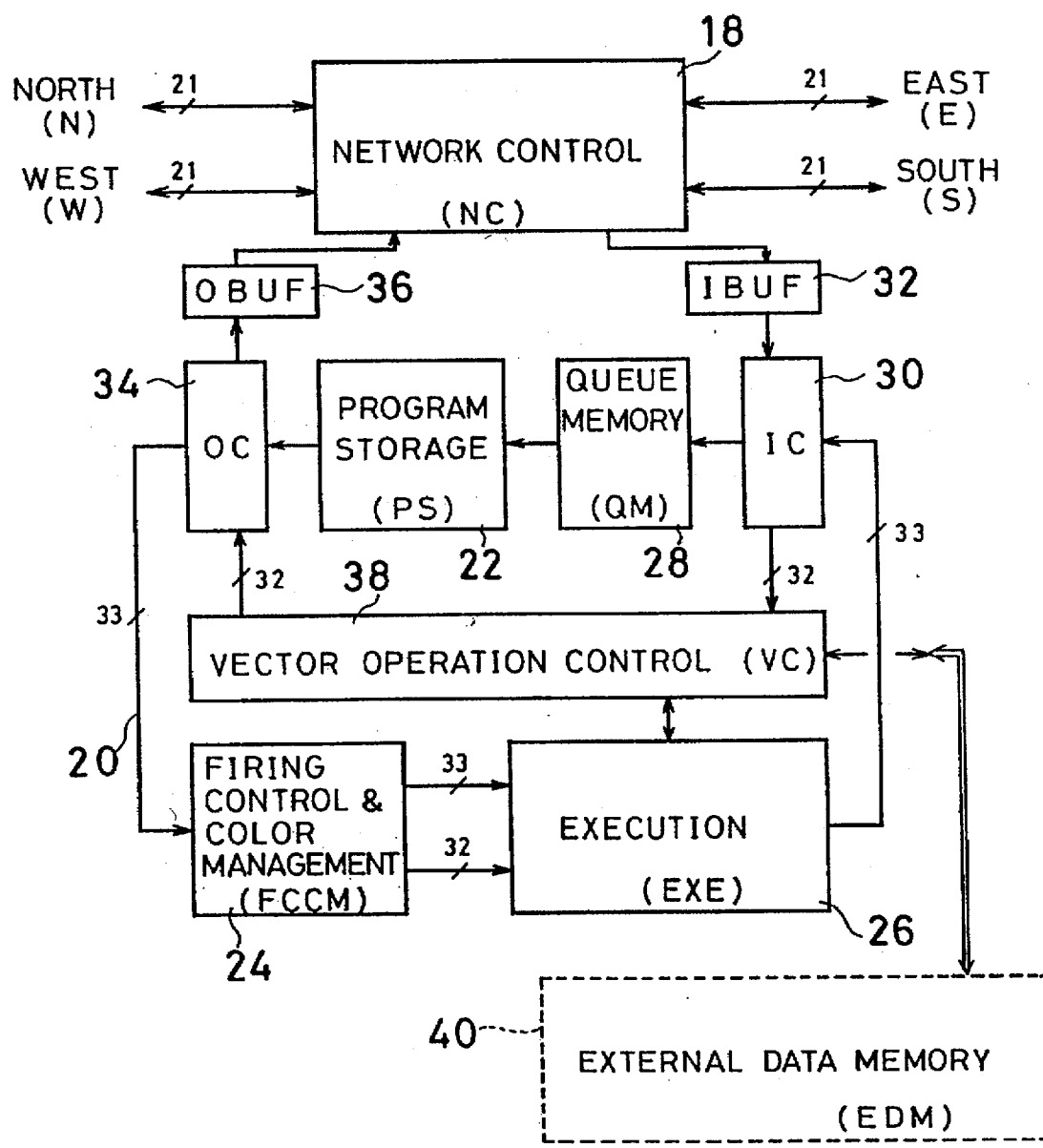
FIG. 2 is a block diagram showing one example of a processing element (PE) of FIG. 1 embodiment.

The network 16 includes a number of processing elements PE00–PEmn arranged in a mesh network form. Each of the processing elements PE00–PEmn is specifically constructed as shown in FIG. 2. On the network 16, the processing elements PE00–PEmn are constructed as a torus mesh network. In addition, a torus mesh network means continuation and operation wherein a large number of processing elements are arranged in a matrix form and it is possible to communicate data between arbitrary processing elements by row direction communication lines RC and column direction communication lines CC which circularly couple the processing elements in row directions to each other and the processing elements in column directions to each other, respectively. In FIG. 1 embodiment, n processing elements PE00–PE0n arranged in a first row are circularly (in a ring form) coupled to each other by a row direction communication line RC0, processing elements PE10–PE1n included in a second row are circularly coupled to each other by a row direction communication line RC1, and processing elements PEm0–PEmn of an m-th row are circularly coupled to each other by a row direction communication line RCm. Furthermore, m processing elements PE00–PEm0 arranged in a first column are circularly coupled to each other by a column direction communication line CC0, processing elements PE01–PEm1 included in a second column are circularly coupled to each other by a column direction communication line CC1, and processing elements PE0n–PEmn of an n-th column are circularly coupled to each other by a column direction communication line CCn.

In this torus mesh network 16, in order to communicate data between the host computer 12 and respective processing elements PE00–PEmn, as inserters, network interfaces NIF are respectively inserted in the respective column direction communication lines CC0, CC1, . . . , CCn.

A processing element PE shown in FIG. 2 is constructed as an LSI of a single chip, which basically includes a network control unit (NC) 18 and a pipeline ring (PR) 20, and further includes a program storage (PS) 22, a firing control and color management unit (FCCM) 24, an execution unit (EXE) 26 and a queue memory (QM) 28. Between the PR 20 and the NC 18, the data is received and sent via an input control unit (IC) 30 and an input buffer (IBUF) 32, and an output control unit (OC) 34 and an output buffer (OBUF) 36.

In order to construct the torus mesh network 16 (FIG. 1), the NC 18 has four (4) bi-directional communication links or ports of north (N), east (E), south (S) and west (W), and controls data transfer between the PR 20 and the NC 18 and data transfer between the processing element and another processing element or the host computer 12. More specifically, the NC 18 inputs a packet inputted from any one of the four ports N, E, S and W to the IBUF 32 or outputs from another port. Furthermore, the NC 18 outputs a packet from the PR 20 to any one of the four ports N, E, S and W. Then, as described later with reference to FIG. 7, the NC 18 has a self-routing function by which an inputted packet is outputted to a predetermined port so that the packet inputted to a given port can be sent to an addressed processing element over the shortest distance.

The IBUF 32 is constructed by a buffer register for a single packet so that a packet inputted from the NC 18 can be temporarily stored, and the packet inputted to the IBUF 32 is inputted to the PR 20 by the IC 30. Although not shown in detail, the IC 30 includes various registers in which a processing element (PE) number of a processing element including the IC 30, an addressed PE number to which a dumped packet is to be sent, a status flag of the processing element, and other information are stored. In addition, the IC 30 gives a packet to a vector operation control unit (VC) 38 as necessary.

The QM 28 is constructed as a FIFO (First-In First-Out) memory having a capacity of 64 packets, for example. The QM 28 absorbs a temporary increase of the number of packets on the PR 20 when the packets are inputted or when the packet is copied and there are variations of a data flow due to variations of times for various kinds of operations on the PR 20.

The PS 22 includes a program memory for storing a data-driven type program having a format as shown in FIG. 4, for example, i.e. connection information and operation codes at respective nodes and etc. of a data flow graph, and the PS 22 performs renewal of control information such as a node number, a copy of the data, application of constants, and etc.

The OC 34 outputs a packet on the PR 20 or a packet from the VC 30 to the OBUF 36. The OBUF 36 has a capacity of one packet so that an output packet from the OC 34 can be temporarily stored. As described above, a packet outputted to the NC 18 is outputted to any one of the four ports N, E, S and W from the OBUF 36.

The FCCM 24 performs queuing of a left and right operands to execute instruction, queuing of a large number of data for synchronous processing, setting of a color in calling a subroutine, or returning of a color in returning a subroutine. The FCCM 24 includes a memory having a format shown in FIG. 5, and the memory has a queue memory in which unfired operand data and an unused color are chained and stored, and a stack memory for storing vacant addresses of the queue memory. A packet outputted from the FCCM 24 is given to the EXE 26 in which various kinds of instructions such as 32-bit floating point operation, 32-bit integer operation, memory access, vector operation, input/output of structures, judgment of condition, branching and other information.

In addition, the processing element PE has an external data memory (EDM) 40 which is constructed by an SRAM of 512 Kbytes, for example, and the EDM 40 is also used as a local memory.

As described later in detail with reference to FIG. 13 and thereafter, the VC 38 controls a vector operation instruction such as an operation of fellow vectors stored in the EDM 40, an operation of a vector with a constant, a total sum of vector data, a copy of a vector, and etc. However, in the VC 38, a normal memory access instruction is also controlled.

Packet formats used in this embodiment shown are illustrated in FIGS. 3A–3E. Packets are divided broadly into executive packets which are used for executing a program and non-executive packets used for other than execution of a program. However, in packet formats of this embodiment, a packet other than a packet holding structures is constructed as a fixed-length of 33 bits×2 words on the PR 20 and, on the network 18, 18 bits×4 words.

Figure 3A:
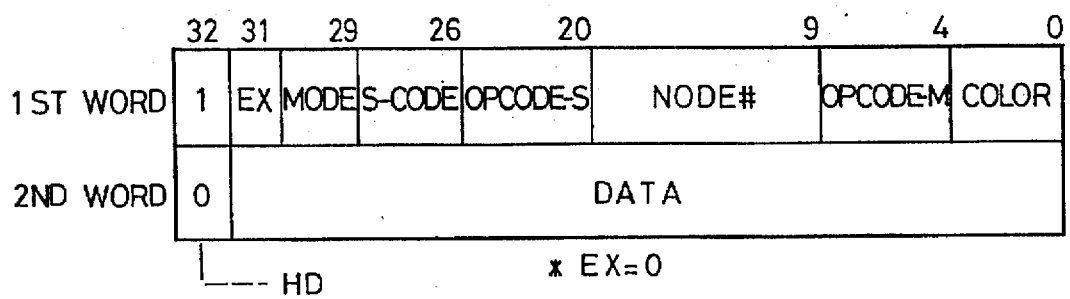
FIGS. 3A, 3B, 3C, 3D, and 3E are illustrative views respectively showing formats of different packets used in FIG. 1 embodiment.

A format shown in FIG. 3A shows an executive packet processed in only the inside of the processing element, being constructed by 33 bits×2 words. A field HD is 1 bit, which is an identifier for identifying a first word (header) and a second word (tail) of 2-word packet. "1" is applied to the header and "0" is applied to the tail. A field EX is 1 bit, which is a flag for indicating that the packet is a packet to be outputted from the PR 20 to the outside of the processing element. Therefore, in a case of FIG. 3A, the flag EX is set as "0". A field MODE is 2 bits, which is an identification code for identifying a kind of packet such as an executive packet or non-executive packet. A field S-CODE is 3 bits, which is an identifying code for defining a content of process for the packet together with the identification code MODE. A field OPCODE-M is a main operation code of 5 bits. The main operation code OPCODE-M defines a kind of operation to be executed in the EX 26 and holds the number of data bits to be processed in synchronism with each other. A field OPCODE-S is a sub-operation code of 6 bits, which defines an instruction defined by the main operation code OPCODE-M in more detail. A field NODE# has 11 bits at maximum, which holds the node number of a data flow graph. A field COLOR is a color identification code of 4 bits, which is an identification code for identifying an execution environment such as co-use of a program by calling a sub-routine call, a process for a time-series data, and other functions in executing the same data flow graph in multiple. A field DATA is 32 bits, which holds numeral value data for an integer operation, a floating point operation, and other operations. In addition, in the EXE 26, the second word of the executive packet is further increased by 32 bits.

Figure 3B:
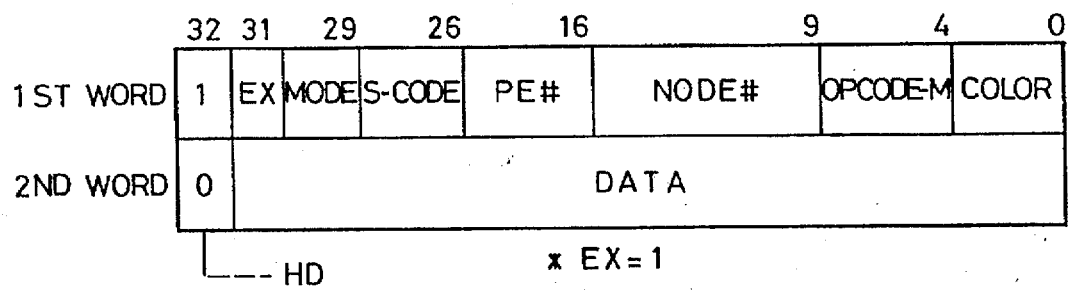

FIG. 3B shows an executive packet which is outputted to the outside from the processing element, which is constructed by 33 bits×2 words as similar to that of FIG. 3A. However, since FIG. 3B packet is to be outputted to the outside, the flag EX is set as "1". When the packet is transferred onto the network, the same is converted into a packet of 18 bits×4 words in the NC 18.

Figure 3C:
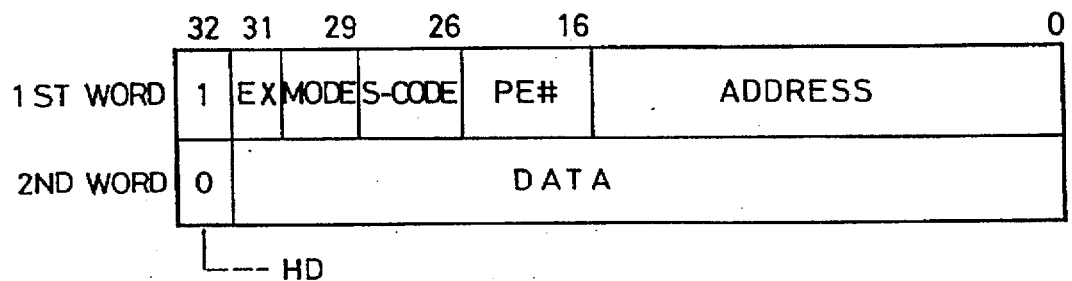

FIG. 3C shows a non-executive packet which is to be processed in only the inside of the processing element, which is constructed by 33 bits×2 words. A filed ADDRESS shown in FIG. 3C is 16 bits, which stores a memory address when data is loaded to the QM 28 or the EDM 40, or the data is dumped therefrom.

Figure 3D:
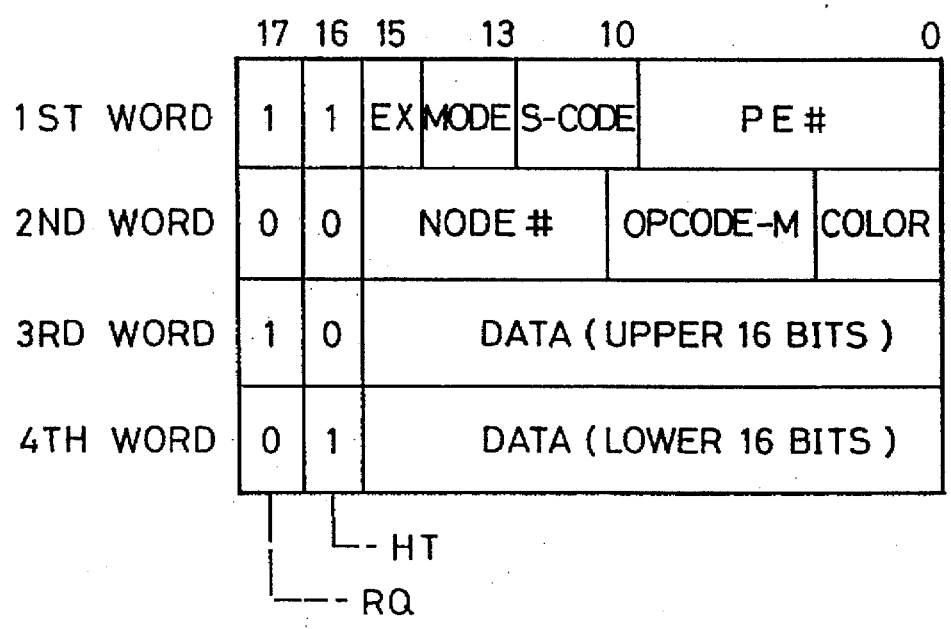
Figure 3E:
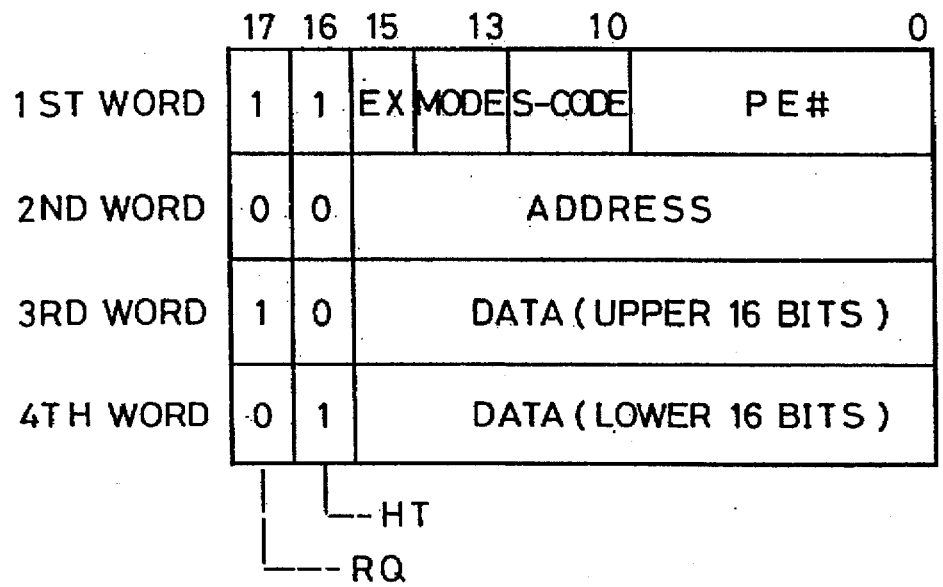

FIG. 3D shows an executive packet transferred onto the network, which is constructed by 18 bits×4 words. In FIG. 3D, a field PE# existing in the first word is 10 bits, which holds identification numbers, that is, the PE numbers for identifying a maximum of 1024 the processing elements. In addition, in a case where the packet is constructed by 4 words as shown in FIGS. 3D and 3E, flags RQ and HT each being 1 bit are added thereto. The flag RQ is added to a packet transferred on the network in a manner that the same is applied as "1" or "0" alternately word by word. Since the flag RQ is inverted at every timing when one word is transferred, by referring to the flag RQ, it is possible to recognize presence of a word. In addition, since the flag RQ is inverted for each word, as described later, the flag RQ functions as a transfer request signal for transferring a packet forward word by word in the data transfer line such as the PR 20. The flag HT is a packet recognition flag which is set as "1" in the first word, i.e. the header and in the last word, i.e. the tail which completes one packet, and "0" is set in the other words. In addition, by the flag RQ and the flag HT, it is possible to identify the header and the tail of the 4-word packet. Specifically, the flags RQ and HT are both set as "1" in a case of the header and, in a case of the tail, the flags RQ and HT are set as "0" and "1", respectively.

FIG. 3E shows a non-executive packet transferred on the network, which is constructed by 18 bits×4 words as similar to the FIG. 3D packet.

In tables I, II, III, IV and V below, kinds or meanings of the packets which are identified by the identification codes MODE and S-CODE are explained.

TABLE I (Normal executive packets)

| MODE | S-CODE | Meaning |
| --- | --- | --- |
| 11 | 000 | Result packet processed in PS |
| 11 | 001 | Packet synchronously processed in FCCM |
| 11 | 110 | Right operand packet processed in FCCM |
| 11 | 111 | Left operand packet processed in FCCM |
| 11 | 100 | Get color packet processed in FCCM |
| 11 | 101 | Free color packet processed in FCCM |
| 11 | 01- | Operation packet processed in EXE |

TABLE II (Load/dump packets)

| MODE | S-CODE | Meaning |
| --- | --- | --- |
| 10 | 000 | Dump packet from PS |
| 10 | 010 | Dump packet from EDM |
| 10 | 100 | Dump packet from FCCM |
| 10 | 110 | Dump packet from various registers |

TABLE II-continued (Load/dump packets)

| MODE | S-CODE | Meaning |
|---|---|---|
| 10 | 001 | Load packet to PS |
| 10 | 011 | Load packet to EDM |
| 10 | 101 | Load packet to FCCM |
| 10 | 111 | Load packet to various registers |

TABLE III (Broadcast packets)

| MODE | S-CODE | Meaning |
|---|---|---|
| 01 | 001 | Broadcast packet of PS |
| 01 | 011 | Broadcast packet of EDM |
| 01 | 101 | Broadcast packet of FCCM |
| 01 | 111 | Broadcast packet of various registers |

TABLE IV (Specific packets)

| MODE | S-CODE | Meaning |
|---|---|---|
| 01 | 000 | Packet for setting communication path of |
| 01 | 010 | |
| 01 | 100 | Structure packet |
| 01 | 110 | |

TABLE V (Output packets)

| MODE | S-CODE | Meaning |
|---|---|---|
| 00 | 000 | Result packet of dump of PS |
| 00 | 010 | Result packet of dump of EDM |
| 00 | 100 | Result packet of dump of FCCM |
| 00 | 110 | Result packet of dump of various registers |
| 00 | 001 | |
| 00 | 011 | End trigger (sink) packet indicative of |
| 00 | 101 | termination of execution of program |
| 00 | 111 | |

Now, constructions of respective units shown in FIG. 2 and operations therein will be described in more detail.

A format of the PS 22 is shown in FIG. 4, and a capacity of the PS 22 is a range of 1k×32 bits–2k×32 bits, and the field NODE# is 11 bits at maximum. When a result packet is arrived at the PS 22, the program memory is read while the field NODE# of the packet is used as an address therefor, and 28 bits from the fourth bit to the 31st bit of a data as read is stored in a predetermined field of the first word of an arrived packet. Thus, a node number is renewed. At this time, if a flag CONST is "0", the arrived packet is outputted while the second word, i.e. the field DATA of the arrived packet remains. If the flag CONST is "1", since the constant data is stored in the next address, the constant data is stored in the second word of the arrived packet, being outputted. Thus, the constant is applied. In addition, if a flag COPY is "1", a next address of the program memory is further read and the above described process is repeated. Thus, a copy operation is executed.

In the FCCM 24, two packets having the same identification code (tag) which is 15 bits in total of the identification code NODE# (11 bits) and the color code COLOR (4 bits) are queued, and the FCCM 24 outputs the same to the EXE 26 as an operand pair. Therefore, if there is a queue memory in which 32k packet can be stored, it is possible to easily accomplish firing-control by accessing the queue memory by the tag of 15 bits. However, a memory capacity assigned to such a queue memory is 256 packets at most. Therefore, in this embodiment shown, 7 bits of the 15-bit tag is used as a hash address, and the coincidence of the tags is detected by comparing the remaining 8 bits by means of a comparator. Then, as shown in FIG. 5, as the queue memory, there is provided a hash memory directly accessed by the hash address and a buffer memory which stores packets being chained by a pointer when a hash crash occurs (when no address data exists in the hash memory), and a portion of the buffer memory is also used for color management. A stack memory (128 words) is provided as a mechanism for controlling vacant addresses of the buffer memory. In addition, the hash memory and the buffer memory are formed by dividing a memory of 256 packets. Furthermore, in the field of DATA of the hash memory or a buffer memory, operand data is being queued or unused color is stored. In a field TAG, 8 bits of the tag other than the bit used as the hash address are stored. A flag LR distinguishes that the operand data being queued is a left operand or a right operand by means of "1" or "0". A flag FE distinguishes whether or not there is an operand being queued by means of "1" or "0". A flag NX distinguishes whether or not a succeeding operand is chained by a pointer by means of a "1" or "0".

In the FCCM 24 having such a hash memory and a buffer memory, a firing control process is executed as set forth in the following. More specifically, in an initial state, the flags FE and NX of all the addresses are cleared (load "0") and vacant addresses of the buffer memory are loaded in the stack pointer. Thereafter, when a right or left operand packet arrives, the hash memory is read by the hash address derived from the fields NODE# and COLOR of that packet. At this time, if the flag FE is "0", the packet is written in the address designated by the hash address, and thereafter, the flag FE is set as "1". If the flag FE is "1", the tag of the hash memory addressed by the hash address and the tag of the packet are compared with each other. When the both are coincident, the field DATA of the operand packet and the field DATA of the hash memory addressed by the hash address are paired and outputted. If the flag NX is "0", the flag FE is cleared and, if the flag NX is "1", the buffer memory is read by a pointer value of an address designated by the hash address, and thereafter, the same is written in an address of the hash memory designated by the hash address. In addition, the pointer value is pushed down into the stack pointer by using the pointer value as a vacant address.

In the comparison of the tags, if the both tags are not coincident with each other, the flag NX of the address designated by the hash address is referred to. If the flag NX is "0", the vacant address of the buffer memory is popped up from the stack pointer, and the vacant address is written in the pointer field designated by the hash address, and thereafter, the flag NX is set as "1" and the packet is written into the vacant address of the buffer memory. If the flag NX is "1", the buffer memory is read by the pointer value of the address designated by the hash address to compare the tags. If both tags are coincident with each other, the field DATA of the operand packet and the field DATA of the address designated by the pointer value are paired and outputted, and thereafter, the flag FE is reset and an address that becomes vacant is pushed down in the stack. Furthermore, if the operand packet thus fired is the last packet of a queue list, the pointer is traced in a reverse direction and the flag NX is set as "0". If the operand as fired is one on a midway of the queue list, the pointer is operated so that the operand is deleted from the queue list. In addition, the tags are not coincident with each other in the above described comparison, the flag NX is referred to. If the flag NX is "0", the vacant address of the buffer memory is popped up from the stack and the vacant address is written in the pointer field of the address designated by the pointer value, and the flag NX is set. In addition thereto, the packet is written in the vacant address of the buffer memory. If the flag NX is "1", the pointer value of the address designated by the pointer value is renewed as a new pointer value, and thereafter, the above described process is repeated.

Then, a fired packet which holds an operand pair is renewed as an operation packet to be processed in the EXE 26 while the most significant bit of the field S-CODE is set as "0".

In addition, in the FCCM 24, a synchronous process of multiple inputs (Nsync) is executed as set forth in the following. It is waited until N packets having the same tag have arrived, and when all the N packets have arrived, one result packet in which the field S-CODE is set as "000" is outputted. A packet of the multiple inputs synchronous process holds the number of packets to be synchronously processed in the main operation code OPCODE-M. Therefore, although the content of the process is substantially the same as that of the above described firing control, not the operand but the number of packets is stored in the field DATA of the queue memory, and the data of the number of packets is decremented at every timing when the coincidence of the tags is detected. Then, the tags are successively coincident with each other and the number of packets becomes zero, the least significant bit of the field S-CODE of the packet as arrived lastly is cleared and outputted as a result packet.

A color process is performed as set forth in the following. In an initial state, usable colors are stored in the buffer memory in a state where the same are chained by a pointer while the 255th address of the queue memory is at the head. Vacant addresses except for the addresses in which the colors are stored are loaded in the stack and, in response thereto, a stack pointer is set in a correct value. If the get color packet or free color packet is arrived at, the head of the color list, that is, the 255th address is accessed. The aforementioned firing-control is performed while the get color packet is a right operand and the free color packet is a left operand. Such a firing-control is different from the normal firing control in a point that a firing occurs without condition even though the tags are not coincident with each other. Then, when the firing occurs, the field S-CODE is renewed as "01-" and such a operand is outputted as a data pair. In addition, a color to be returned is held in the field DATA of the free color packet and its own node number and a color are held in the field DATA of the get color packet. NOP (no operation) is held as an operation code in the get color packet and RETURN is held as an operation code in the free color packet. The operation code RETURN is an operation code for storing the right operand data in the field NODE# and COLOR of the header of the left operand data. Thus, even if any one of the get color packet and the free color packet is first arrived at the FCCM 24 and the firing occurs, at least a timing when such a packet is outputted from the EXE 26, the node number and the color become of those being held in the get color packet and a new color as gotten is held in the data field of the second word.

Figure 6:
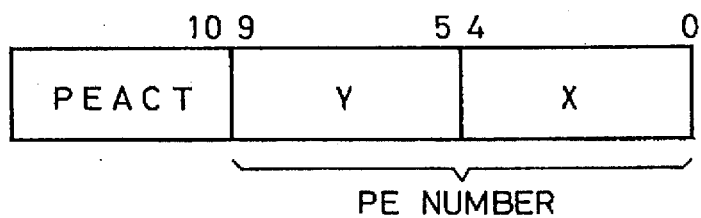
FIG. 6 is an illustrative view showing one example of a number register included in an input control unit (IC) shown in FIG. 2.

In addition, as described above, in the IC 30, there is provided with a PE number register as shown in FIG. 6 for storing an inherent number of the processing element, i.e. PE number, and in FIG. 6, "X" is the number of a lateral direction (east-west direction) in the torus mesh network 16 (FIG. 1), that is, the column number and "Y" is the number of a longitudinal direction (south-north direction), that is, the row number. The PE number which inherently identifies each processing element is constructed by "X" and "Y". However, a flag PEACT shown in FIG. 6 is a flag indicative of whether or not the PE number has been set, and the same is "0" if no PE number is set and becomes "1" when the PE number is set.

One aspect of the parallel computer 10 in accordance with the present invention exists in a point that a process mode of the NC 18 is changed in accordance with a state of the flag PEACT shown in FIG. 6. More specifically, the NC 18 sets a specific mode when the flag PEACT is "0", that is, no PE number is set, and a normal mode is set when the flag is "1". In the specific mode, the NC 18 regards all the packets (shown in the previous table IV and inputted from the all the ports) as the packets to be inputted to the NC 18 itself, and inputs the packets in the PR 20 and executes a predetermined process designated by the identification code included in the packet. In addition, in the normal mode, the NC 18 compares the PE number existing in the first word of the packet as arrived at with the PE number being set in the number register (FIG. 6) of itself and inputs the packet to the PR 20 only when the both are coincident with each other. If the both are not coincident, the NC 18 outputs the packet as arrived at to any one of the ports in accordance with a predetermined routing algorithm (described later in detail with reference to FIG. 7).

Figure 10:
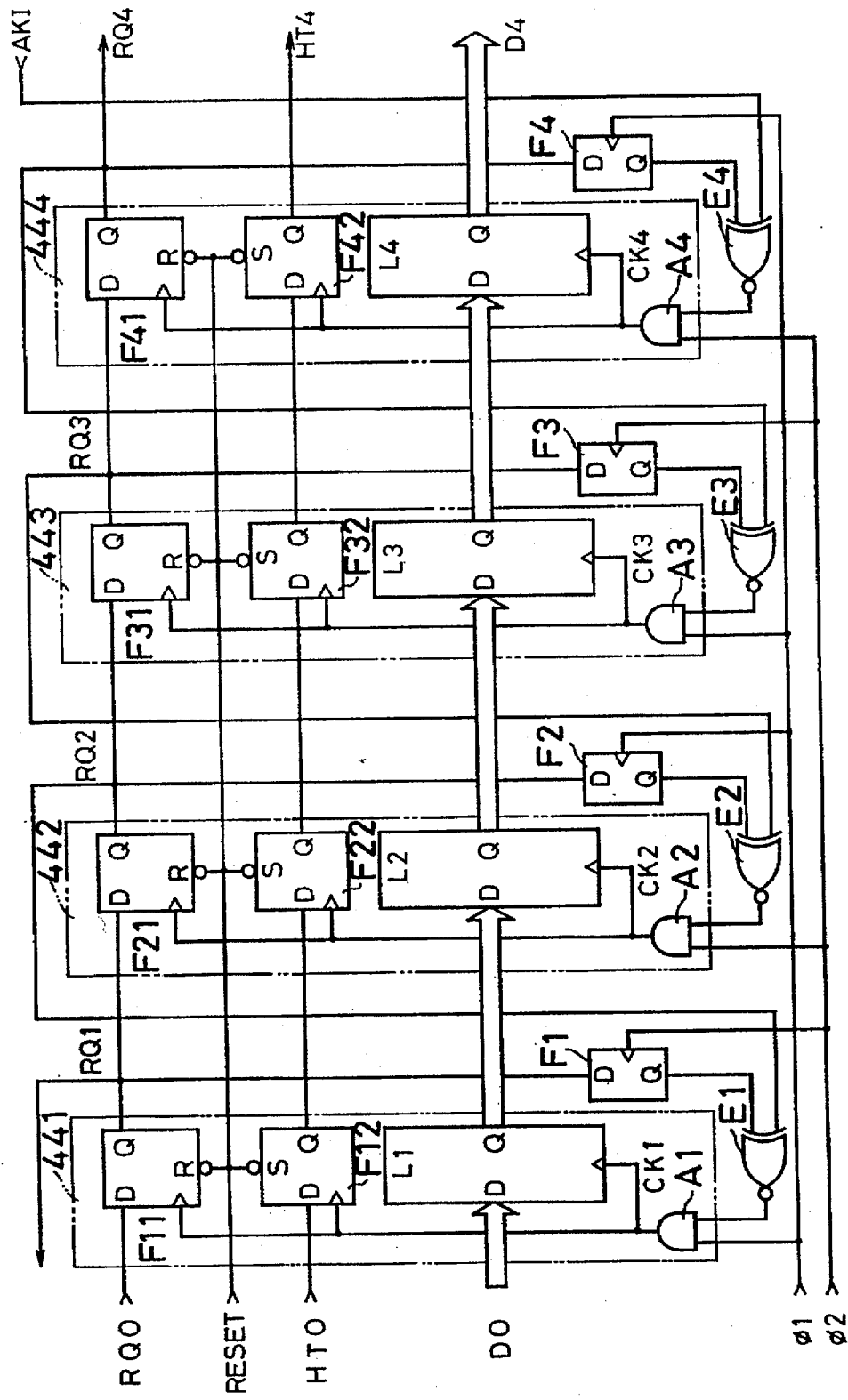
FIG. 10 is a block diagram showing one example of a self-synchronous shift register capable of being used as a data transfer line such as an input/output register of a network control unit (NC) of FIG. 7 embodiment.

Now, the NC 18 included in each of the processing elements will be described in detail with reference to FIG. 7. Input shift registers RNI, REI, RSI and RWI and output shift registers RNO, REO, RSO and RWO are connected to the ports N, E, S and W in parallel with each other, respectively. Each of these shift registers is a self-synchronous shift register as shown in FIG. 10, for example, and constructed by 18 bits×4 stages. Outputs of the input shift registers RNI, REI, RSI and RWI are given to branch circuits R1, R2, R3 and R4, respectively. Inputs of the output shift registers RNO, REO, RWO and RSO are given from joining circuits M1, M2, M3 and M4, respectively.

The branch circuit R1 outputs an inputted packet from the input shift register RNI to the joining circuit M2, M4 or M5. As similar thereto, a packet inputted from the input shift register REI is outputted from the branch circuit R2 to the joining circuit M1, M3, M4 or M5. A packet from the input shift register RSI is inputted to the joining circuit M1, M2 or M5 through the branch circuit R4. A packet from the input shift register RWI is branched to the joining circuit M1, M2, M4 or M5 in the branch circuit R3.

The joining circuit M1 joins packets respectively given from the branch circuits R2–R5 to give the same to the output shift register RNO, that is, the port N. The joining circuit M2 joins the packets given from the branch circuits R2 and R5 and outputs the same to the output shift register REO, that is, the port E. The joining circuit M3 joins packets from the branch circuits R3, R1, R4 and R5 to output to the output shift register RWO, that is, the port W. The joining circuit M4 joins packets sent from the branch circuits R1, R3, R2 and R5 to input to the output shift register RSO, that is, the port S.

In addition, the branch circuit R5 receives a packet from the OC 34 included in the PR 20 (FIG. 2) and thus the OBUF 36 and outputs to any one of the joining circuits M1–M4.

The joining circuit M5 joins packets sent from the branch circuits R1–R4 to output the IC 30 included in the PR 20 (FIG. 2) and thus the IBUF 32.

Presupposing the following condition, a routing algorithm of each of the branch circuits R1–R5 is as set forth in the following items (1)–(5).

A network is a torus mesh as shown in FIG. 1, and a network size thereof is m×n, an own PE number is represented by x, y, an addressed PE number is represented by X, Y, and in the NC 18 of each processing element, differences $\Delta x$ and $\Delta y$ between the addressed PE number and its own PE number are calculated in accordance with following formulas.

$$\Delta x \equiv (X-x) \bmod n$$

$$\Delta y \equiv (Y-y) \bmod m$$

where, $$|\Delta x| \leq n/2$$

$$|\Delta y| \leq m/2$$

In addition, the PE numbers are y=0, 1, 2, ..., m in sequence in a direction from north (N) to south (S) and x=0, 1, 2, ..., n in sequence in a direction from west (W) to east (E). Then, a packet having an identification code MODE of "00" is a packet to be transferred to the host computer 12 and a flag PEACT indicates whether or not the PE number has been applied.

(1) Branch circuit R1

When MODE≠00 and (PEACT=0 or $\Delta y$=0), a packet is outputted to the joining circuit M5.

When MODE=00 and PEACT=1 and $\Delta y$=0, a packet is outputted to the joining circuit M2.

Otherwise, a packet is outputted to the joining circuit M4.

(2) Branch circuit R2

When MODE≠00 and (PEACT=0 or $\Delta x=\Delta y$=0), a packet is outputted to the joining circuit M5.

When PEACT=1 and $\Delta x$=0 and $\Delta y$>0, a packet is outputted to the joining circuit M4.

When PEACT=1 and $\Delta x$=0 and $\Delta y$<0, a packet is outputted to the joining circuit M1.

Otherwise, a packet is outputted to the joining circuit M3.

(3) Branch circuit R3

When MODE≠00 and (PEACT=0 or $\Delta x=\Delta y$=0), a packet is outputted to the joining circuit M5.

When PEACT=1 and $\Delta x$=0 and $\Delta y$>0, a packet is outputted to the joining circuit M4.

When PEACT=1 and $\Delta x$=0 and $\Delta y$<0, a packet is outputted to the joining circuit M1.

Otherwise, a packet is outputted to the joining circuit M2.

(4) Branch circuit R4

When MODE≠00 and (PEACT=0 or $\Delta y$=0), a packet is outputted to the joining circuit M5.

When MODE≠00 and PEACT=1 and $\Delta y$=0, a packet is outputted to the joining circuit M4.

Otherwise, a packet is outputted to the joining circuit M1.

(5) Branch circuit R5

When $\Delta x$=0 and $\Delta y$>0, a packet is outputted to the joining circuit M4.

When $\Delta x$=0 and $\Delta y$<0, a packet is outputted to the joining circuit M4.

When $\Delta x$<0, a packet is outputted to the joining circuit M3.

Otherwise, a packet is outputted to the joining circuit M2.

In addition, packets inputted to the joining circuits M1, M2, M3 and M4 are inputted to the output shift register RNO of the north port of N, output shift register REO of the east port E, output shift register RWO of the west port W and output shift register RSO of the south port R, respectively. In addition, a packet inputted to the joining circuit M5 is inputted to the PR 20 via the input control unit IC (FIG. 2).

Figure 7:
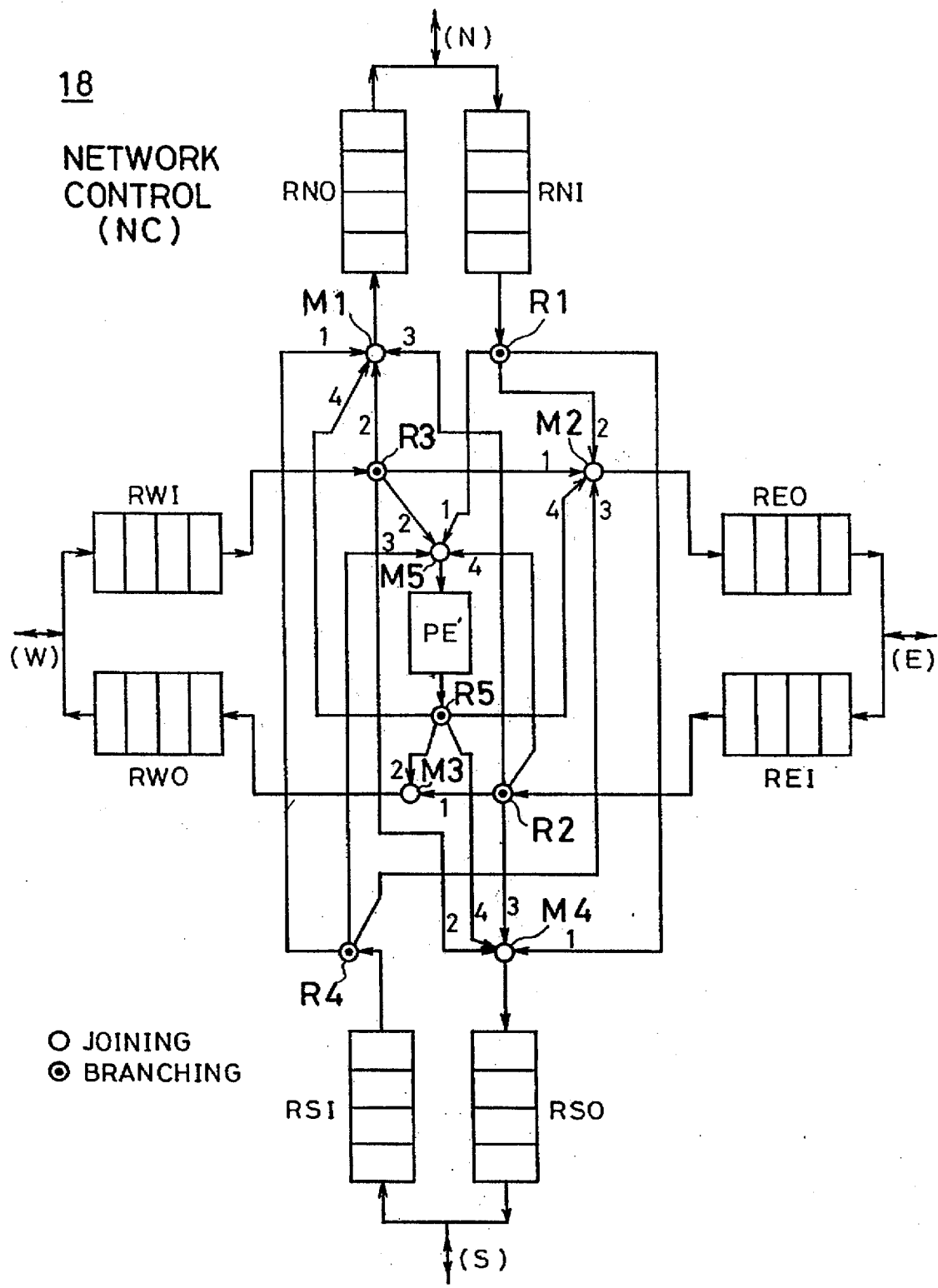
FIG. 7 is a block diagram showing one example of a network control unit (NC) shown in FIG. 2.

In the NC 18 shown in FIG. 7, a routing is executed in accordance with the above described algorithm when the header of the packet is arrived at, and the succeeding data are outputted to the same route until the tail of that packet is arrived at.

Figure 8:
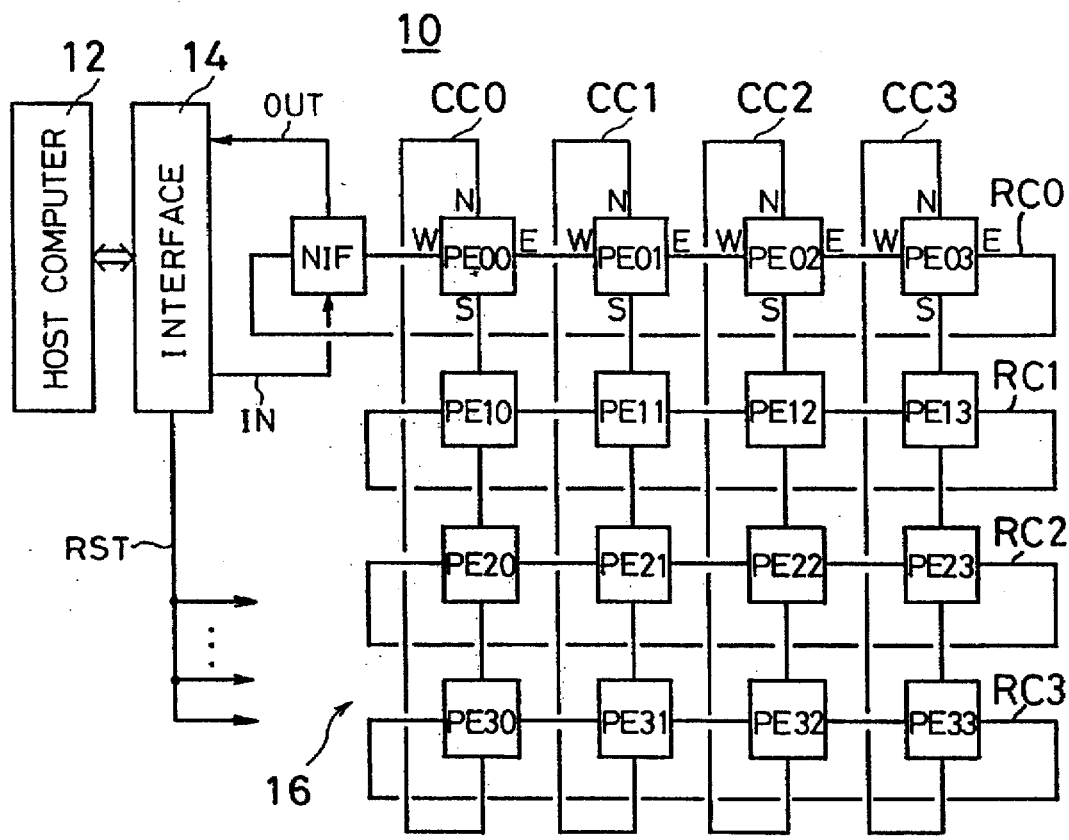
FIG. 8 is a block diagram showing a modified embodiment of the FIG. 1 embodiment.

Furthermore, in FIG. 7 embodiment, presupposing that the respective processing elements PE are arranged in the torus mesh network 16 as shown in FIG. 1 or FIG. 8, modulo is calculated in accordance with the above described formulas. However, in a case where the respective processing elements PE are arranged in a non-torus mesh network, that is, in a case where respective communication lines RC and CC shown in FIG. 1 are not ring form, such modulo calculation become unnecessary. In addition, the above described algorithm of the branch circuits R1–R5 are only examples, and therefore, modification or change may be possible arbitrarily.

FIG. 8 shows a modified embodiment of FIG. 1 embodiment, which includes 16 (=4×4) processing elements PE00–PE33 arranged in a manner of a torus mesh on the network 16. Then, a packet outputted from the host computer 12 is converted into a data format of 4-word construction as shown in FIG. 3D or 3E in the interface 14 to be inputted to the NC 18 (FIG. 2) of each processing element via the input line IN and the network interface NIF.

In FIG. 8 embodiment, at a time when the power of this parallel computer 10 is turned on, the contents of the PE number registers (FIG. 6) of respective processing elements are indefinite. Therefore, the host computer 12 gives a hardware reset signal RST to all the processing elements PE00–PE33. In response thereto, the flags PEACT (FIG. 6) are reset as "0" in all the processing elements PE00–PE33, and as described above, an operation mode of each processing element is set as a specific mode.

Succeedingly, a load packet having "00" in the filed DATA as shown in FIG. 3E to be loaded in the PE number register from the host computer 12 is outputted. A first load packet is sent to the port W of the NC 18 (FIG. 2) of the processing element existing at a left and upper end in FIG. 8 through the interface 14, input line IN and network interface NIF. At this time, since the branch circuit R3 (FIG. 7) included in the NC of its processing element is set as a specific mode because the flag PEACT is "0", the branch circuit R3 inputs a packet as arrived at to the joining circuit M5, that is, the PR 20 (FIG. 2). Therefore, "00" is set in the number register (FIG. 6) of the processing element as its own PE number, and the flag PEACT is set as "1". Thereafter, the processing element existing at the left and upper end in FIG. 8, that is, in the first row and the first column is identified as "PE00".

Succeedingly, a second load packet in which "01" is held in the field DATA thereof and X=1 and Y=0 are held in the field PE# thereof is outputted from the host computer 12. The second load packet is arrived at the port W of the NC 18 of the processing element PE00 as similar to the first load packet, but the flag PEACT of the processing element PE00 has been set as "1", and therefore, in the branch circuit R3 included in the NC 18 of the processing element PE00, in accordance with a condition of $\Delta x \neq 0$, the second load packet is outputted to the joining circuit M3, i.e. the port E as it is. Therefore, the second load packet is arrived at the port W of the NC 18 of the processing element in the first row and second column in FIG. 8. At this time, since the flag PEACT is "0", as done in the processing element PE00, the PE number "01" is set in its number register (FIG. 6) and the flag PEACT is set as "1". Thereafter, the processing element of the first row and the second column in FIG. 8 is identified as "PE01". As similar thereto, the PE number "02" is set in the processing element of the first row and the third column in FIG. 8 is set and the PE number "03" is set in the processing element of the first row and the fourth column.

When a fourth load packet ("10" is held in the field DATA thereof and X=0 and Y=1 are held in the field PE# thereof) is arrived at the port W of the processing element PE00, a condition that PEACT=1 and $\Delta x=0$ and $\Delta y>0$ are established in the branch circuit R3 included in the NC 18 of the processing element PE00, and therefore, the fourth load packet is outputted to the joining circuit M4, i.e. the port S as it is to be inputted to the processing element in the second row and the first column. Therefore, the PE number "10" is set in the number register of the processing element of the second row and the first column in FIG. 8, and the flag PEACT is set as "1".

When the PE numbers as shown in FIG. 8 are set in all the processing elements, the flag PEACT of each of all the processing elements PE00–PE33 is set as "1". Therefore, the parallel computer 10 can be operated in the normal mode, thereafter.

Thus, it is possible to automatically set the PE numbers to the respective processing elements by only outputting packets which include the PE numbers to be set are outputted from the host computer 12. Therefore, without troublesome work such as operations of the dip switches as done in the system using the conventional ImPP, it is possible to set and change the PE numbers. In addition, complex external circuits become unnecessary.

When the PE number is thus inherently applied to each processing element PE, next, in order to set the identification code MODE as "10" and S-CODE as "001", and by designating the PE number, to set program in the PS 22 (FIG. 2) of the processing element designated by the PE number, a packet having a format shown in FIG. 3E is outputted from the host computer 12. At this time, an address of the PS 22 of its processing element is held in the field ADDRESS. Then, the program data is repeatedly outputted until the program is completed with respect to one processing element. However, in a case where the same program is to be loaded to the other processing elements, it is possible to use the broadcast mode shown in the previous table III.

In a case where a packet for the broadcast mode is sent from the host computer 12, a data format shown in FIG. 3E is used, and a packet having a format shown in FIG. 3C is used on the PR 20. Then, in the field ADDRESS, an address of the program memory to which the program data is to be stored is held, and the PE number of the processing element is held in the field PE#. When the broadcast packet (S-CODE=001) having a format shown in FIG. 3E is inputted to the PR 20, the field PE# is incremented by "1" in the IC 30 (FIG. 2) and the flag EX is reset as "0". Then, in the processing element, the program data is loaded to the address of the program memory as designated, the flag EX is set as "1", and the address is sent to the processing element identified by the PE number as incremented through the NC 18 of the processing element. Therefore, if the broadcast mode is utilized, it is possible to efficiently write the same program data in the same addresses of the program memories included in the PS 22 of each of all the processing elements.

If the program data is thus completely set in the program memory included in the PS 22, the host computer 12 succeedingly loads necessary initial value data to the EDM 40. Such initial value data include necessary constants for execution of the program which has been previously set. In addition, in loading the initial value data, the above described broadcast mode is also utilized, and therefore, a duplicate description will be omitted here. Thus, the parallel computer 10 does not perform a normal operation process in the normal mode until the loading of the program to the PS 22 of each processing element and the loading of the initial value data to the EDM 40 are completed.

In the normal mode, in the parallel computer 10 of this embodiment shown, the PE number (X, Y) of the processing element to which a packet to be sent is compared with its own PE number (x, y). When X≠x, the packet is transferred from the west port W to the east port E or from the east port E to the west port W. Then, if X=x and Y≠y, the packet is transferred from the north port N to the south port S or from the south port S to the north port N. In addition, when the packet is transferred from the west port W or east port E to the north port N or the south port S, or when the packet is transferred from the PR 20 (FIG. 2) to any one of the ports W, E, N and S, in accordance with a self-routing algorithm on the basis of the above described modulo calculation, a direction that a distance between the processing elements (the packet is to be transferred therebetween) become the shortest is selected in the branch circuit R5 (FIG. 7), and therefore, the packet is always routed with the shortest distance.

More specifically, in a case where a packet is transferred from the processing element PE20 to the processing element PE03 in FIG. 8 embodiment, the modulo calculation in accordance with the above described formulas are executed in the NC 18 of the processing element PE20. As a result thereof, in the processing element PE20, $\Delta x$ becomes $\Delta x=-1$ and $\Delta y$ becomes $\Delta y=2$. Therefore, in the branch circuit R5 of the NC 18 (FIG. 7), $\Delta x<0$ is established, the packet outputted from the PR 20, that is, the OBUF 36 (FIG. 2) is transferred to the output shift register RWO of the west port W through the joining circuit M3. Therefore, the packet is transferred to the processing element PE23 included in the fourth column from the west port W through the row direction communication line RC2. In the processing element PE23, the packet is fetched in the input shift register REI of the east port E of the NC 18, the same is transferred to the branch circuit R2. At this time, as a result of the modulo calculation, in the processing element PE23, $\Delta x$ becomes as $\Delta x=0$ and $\Delta y$ becomes as $\Delta y=2$. Therefore, in the branch circuit R2 of the processing element PE23, $\Delta x=0$ and $\Delta y>0$ are established, and therefore, the packet is loaded to the output shift register RSO of the south port S through the joining circuit M4. Therefore, the packet is transferred to the processing element PE33. In the processing element PE33, the modulo calculation results ($\Delta x=0$ and $\Delta y=1$ ($\Delta y>0$), and therefore, in the branch circuit R2, the packet is outputted to the south port S as similar to the previous processing element PE23. Therefore, the packet outputted from the processing element PE20 is inputted to the north port N of the objective processing element PE03 through the processing elements PE23 and PE33. Thus, in the NC 18 shown in FIG. 7, the self-routing with the shortest distance is performed.

In the normal mode, a result packet obtained through the execution of the program and a result packet dumped respective portions of the respective processing elements, and etc. are outputted toward the host computer 12, and in such a result packet, an objective processing element is designated as PE03 in a sending processing element and the identification code MODE is set as "00" so as to indicate that the packet is to be sent to the host computer 12.

Then, as described above, the result packet is transferred toward the processing element PE03 with the shortest distance, and when the result packet is arrived at the processing element PE03, a condition of $\Delta x = \Delta y = 0$ and MODE=00 is established as a result of the modulo calculation. Therefore, in the processing element PE03, for example, the result packet inputted from the north port N is outputted to the east port E through the joining circuit M2. As similar thereto, the result packet inputted from the west port W is transferred to the joining circuit M2 because none of conditions is established in the branch circuit R3. In addition, when the result packet is inputted from the south port S, since a condition of MODE=00 and PEACT=1 and $\Delta y = 0$ is established in the branch circuit R4, the result packet is given to the joining circuit M2. Thus, the result packet arrived at the port N, W or S of the processing element PE03 is always outputted to the east port E thereof, and therefore, the same is inputted to the network interface NIF.

In addition, the result packet to be transferred to the east port E of the processing element PE03 through the west port W of the processing element PE00 is inputted in the network interface NIF as an inserter before arrival to the processing element PE03. Then, in the network interface NIF, the field MODE of the result packet as arrived at is always watched, and if MODE≠00, the result packet is passed from the east to the west or from the west to the east as it is. However, since MODE is set as "00" in the result packet, in the network interface NIF, the result packet as arrived at is transferred to the host computer 12 through the output line OUT and the interface 14.

By a self-routing function as described above, a result packet outputted from any of the processing elements is transferred toward the host computer 12 with the shortest distance, and it is possible to implement a self-routing function without disturbance of the network topology of the parallel computer 10 that is a torus mesh network.

One feature of the present invention is that the network interface NIF which functions as an inserter of the row direction communication lines RC or the column direction communication lines CC constructing a torus mesh network is constructed by the same LSI chip as that of the processing elements PE.

Figure 9:
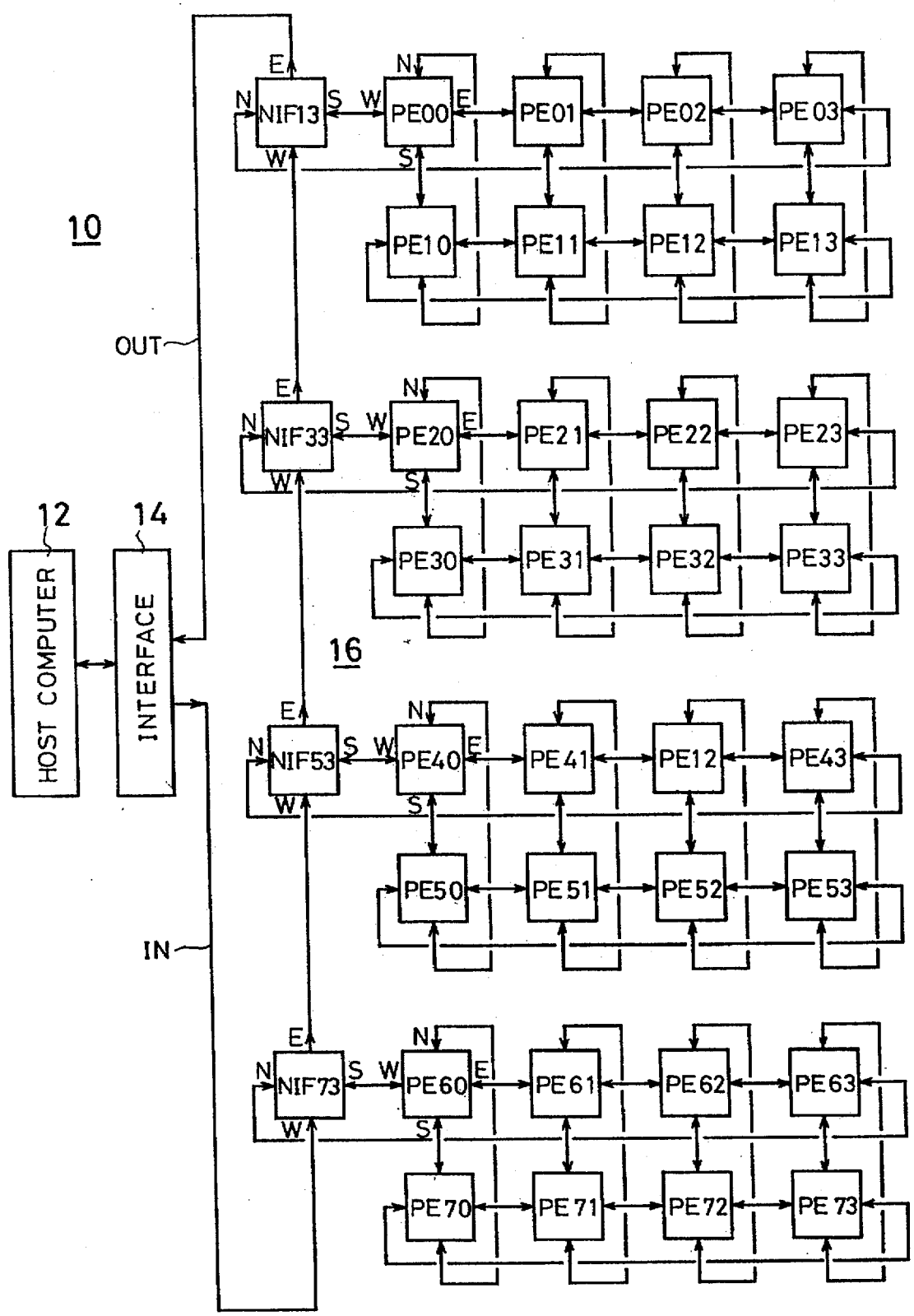
FIG. 9 is a block diagram showing another modified embodiment of the FIG. 1 embodiment.

More specifically, as shown in FIG. 9, in a case where respective processing element groups are coupled in parallel to the host computer 12, the network interface NIF become necessary for each processing element group. Therefore, in order to miniaturize a whole system, it is desired that the network interface NIF as well as processing element PE are constructed by LSIs. However, prodigious labor is needed and it takes a much time to develop different kinds of LSIs, as a result thereof, a cost of the parallel computer 10 is pushed up. Therefore, in the present invention, it is considered that it is possible to implement the network interface NIF by the same LSI chip as that of the processing element PE. Therefore, the processing element PE as well as the network interface NIF are constructed by the same circuit as shown in FIGS. 2 and 7. Then, such an LSI is set so as to have at least two kinds of operation modes of an operation as a processing element and an operation as an interface. Therefore, in FIG. 9 embodiment, from the host computer 12 to the respective processing elements PE and network interfaces NIF, a signal INS defining that the same is to be operated as a processing element or as an interface is inputted. Then, the LSI operates as a processing element when the signal INS is "0" and operates as an interface when the signal INS is "1".

Then, the difference of the operation modes, that is, whether the signal INS is "1" or "0" is determined by the NC 18.

In FIG. 9 embodiment, in a case where the same LSI is used as the processing element PE or the network interface NIF, in the branch circuits R1–R4 of the NC 18, the following algorithm in which judgment of a state of the flag INS is added to the algorithm previously described become necessary.

(1) Branch circuit R1

When MODE≠00 and (PEACT=or ($\Delta y = 0$ and INS=0)), a packet is outputted to the joining circuit M5.

When (MODE=00 and PEACT=1) and ($\Delta y = 0$ or INS=1), a packet is outputted to the joining circuit M2.

Otherwise, a packet is outputted to the joining circuit M4.

(2) Branch circuit R2

When MODE≠00 and (PEACT=0 or ($\Delta x = \Delta y = 0$ and INS=0)), a packet is outputted to the joining circuit M5.

When INS=0 and PEACT=1 and $\Delta x = 0$ and $\Delta y > 0$, a packet is outputted to the joining circuit M4.

When INS=0 and PEACT=1 and $\Delta x = 0$ and $\Delta y < 0$, a packet is outputted to the joining circuit M1.

Otherwise, (including a case of INS=1), a packet is outputted to the joining circuit M3.

(3) Branch circuit R3

When MODE≠00 and (PEACT=0 or ($\Delta x = \Delta y = 0$ and INS=0)), a packet is outputted to the joining circuit M5.

When (INS=0 and PEACT=1 and $\Delta x = 0$ and $\Delta y > 0$) or (INS=1 and PEACT=1 and an addressed PE number is within a predetermined range), a packet is outputted to the joining circuit M4.

When INS=0 and PEACT=1 and $\Delta x = 0$ and $\Delta y < 0$, a packet is outputted to the joining circuit M1.

Otherwise, a packet is outputted to the joining circuit M2.

(4) Branch circuit R4

When MODE≠00 and (PEACT=0 or ($\Delta x = 0$ and INS =0)), a packet is outputted to the joining circuit M5.

When (MODE≠00 and (PEACT=1) and ($\Delta y = 0$ or INS=1), a packet is outputted to the joining circuit M2.

Otherwise, a packet is outputted to the joining circuit M1.

Thus, in a case of the flags PEACT=1 and INS=0, the NC 18 operates in a processor mode. Then, when PEACT =1 and INS=1, the same operates in an interface mode.

In the interface mode, a packet arrived at the port N or S of the NC 18 is, other than the packet to be sent to the host computer 12 (MODE=00), branched toward the port S or N, and the packet to be sent to the host computer 12 is branched to the port E. In addition, the packet arrived at the port W is branched toward the port S only when the PE number of the addressed processing element exists within a predetermined range, and otherwise, such a packet is sent to the port E.

Specifically, in FIG. 9 embodiment, the processing element PE00–PE73 are LSIs each of which is set in the processor mode, and the network interfaces NIF13, NIF33, NIF53 and NIF73 are the same LSIs each of which is set in the interface mode. In this embodiment shown, the data outputted from the host computer 12 is converted into a format shown in FIG. 3D or FIG. 3E in the interface 14, being inputted to the port W or the network interface NIF73 via the input line IN. In such a case, only when the addressed PE number held in the packet exists within a range of "60–73", the packet is outputted to the port S to be arrived at the port W of the processing element PE60. When the addressed PE number exists outside the above described range, the packet sent to the port W of the network interface NIF73 is inputted to the port W of the network interface NIF53 through the port E. In the network interface NIF 53, only when the addressed PE number exists within a range of "40–53", the packet is branched to the port S to be sent to the processing element PE40. As similar thereto, when the packet is given to the port W of the network interface NIF33, the network interface NIF 33 determines whether or not the addressed PE number exists within a range of "20–33". In addition, in the network interface NIF13, it is determined whether or not the addressed PE number exists within a range of "00–13".

If the same LSI becomes to be utilized as an interface or processing element as done in FIG. 9 embodiment, since it is possible to sharply shorten the development period for the LSI, it is possible to contribute toward the decrease of the cost and the miniaturization of the whole system. Furthermore, it is possible to easily exchange a mode only by sending the signal INS from the host computer 12.

In any of the embodiments previously described, when a packet to be transferred from a given processing element to the other processing element, a synchronous data transfer line which operates in response to a clock signal is used. In this case, no problem occur if an addressed processing element is in a state where a packet can be always received; however, when a plurality of packets are simultaneously arrived at one processing element from a plurality of directions and it is necessary to output all the packets to the same direction, the transfer of the remaining packets except for one packet must be stopped. In addition, there is a case where the execution unit of a processing element inhibits a packet from being inputted due to various reasons, in such a case, it is necessary to temporarily stop the transfer of the packet. That is, when a packet does not become to be advanced at a given place, it is necessary to stop the transfer of a succeeding packet in response thereto. Especially, in a case where a large number of processing element construct a network as a parallel computer to which the present invention is directed, when a packet is stopped inside of a processing element, it is necessary to stop packets inside remaining processing elements. In such a case, if a stop signal is simultaneously given from a processing element to all the remaining processing elements, the transfer of the packets can be stopped simultaneously; however, not only such a stop control is very difficult but also a hardware scale for the transfer control becomes very large.

Therefore, an elastic data transfer system is desirable, in which in stopping the packets, all the packets are not simultaneously stopped, when a given packet is first stopped, the succeeding packets are sequentially stopped, and in releasing the stop, after the stop of the packet which was first stopped is released, the stop of the succeeding packets are sequentially released.

However, in order to implement such an elastic data transfer line, in a conventional method, since request signals for data transfer and acknowledge signals responsive thereto, and etc. must be generated wherever needed, a hardware for such a transfer control also becomes a large scale.

Figure 11:
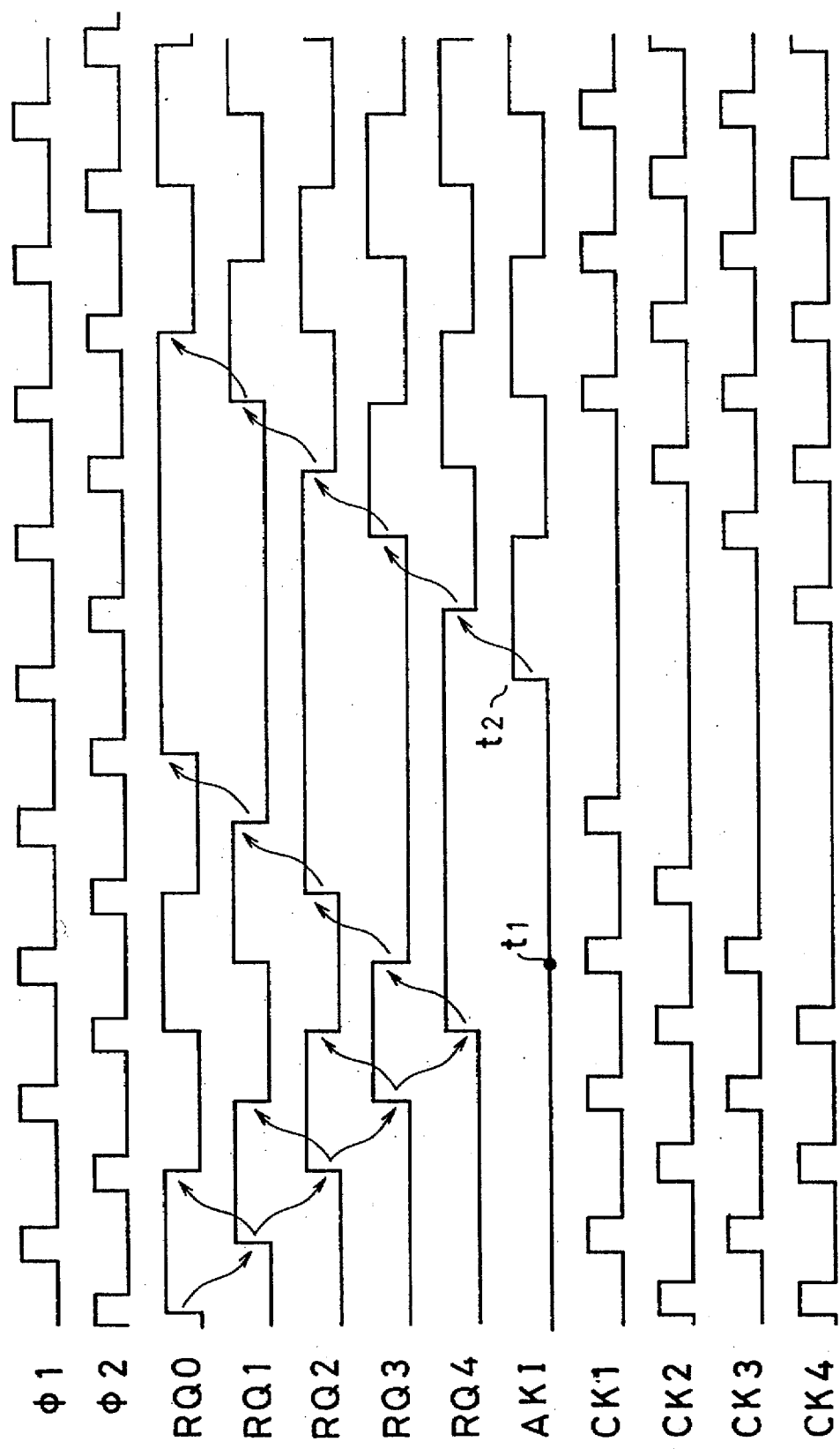
FIG. 11 is a timing chart showing an operation of the FIG. 10 embodiment.

FIG. 10 is a circuit diagram showing a self-synchronous shift register which is usable as a data transfer line capable of dissolving such a problem. A self-synchronous shift register 42 of this embodiment shown includes four stages of latch circuits 441, 442, 443 and 444 connected in a cascade fashion. Each of the latch circuits 441—441 include latches L1–L4 of a predetermined number of bits, to which data is inputted to an input D and outputted from an output Q, and flip-flops F11–F41 and F12–F42 having respective inputs D which receive a transfer control bit RQ and a packet recognition bit HT shown in FIG. 3D or 3E. In addition, each of the latch circuits 441–444 include 2-input AND gates A1–A4, and outputs of the AND gates A1–A4 are given to the latches L1–L4 and the flip-flops F11–F42 as a clock signal therefor. An acknowledge signal AKI sent from a frontword transfer path is given to 2-input exclusive NOR gates E1–E4 together with the outputs of the flip-flops F1–F4. Outputs Q of the flip-flops F11–F44 included in the latch circuits 441–444 are given to respective inputs D of the flip-flops F1–F4. Outputs of the exclusive NOR gates E1–E4 are given to corresponding AND gates A1–A4, respectively. As the other inputs of respective AND gates A1 and A3 and the clocks for respective flip-flops F2 and F4, a clock signal $\phi 1$ is given. As the other inputs of respective AND gates A2 and A4 and the clocks for respective flip-flops F1 and F3, a clock signal $\phi 2$ is given. These clock signals $\phi 1$ and $\phi 2$ are clock signals having a phases opposite to each other, as shown in FIG. 11. By making the clock signals $\phi 1$ and $\phi 2$ on/off by means of the AND gates A1–A4, latch signals CK1–CK4 for the latches L1–L4 can be generated. For example, in the latch circuit 441, a signal that the transfer control bit RQ1 is latched by the clock signal $\phi 2$ and the transfer control bit RQ2 of the latch circuit 442 are compared with each other by the exclusive NOR gate E1, and only when the both are equal to each other, the AND gate A1 is turned on and the clock signal $\phi 1$ and thus the latch signal CK1 is enabled.

In FIG. 10 embodiment, by making the reset signal RESET as "0" temporarily, the transfer control signals RQ1–RQ4 are cleared as "0", respectively, and the packet recognition signals HT0–HT4 are set as "1", respectively. Therefore, in each of the latch circuits 441–444, a state where the tail of the packet is held is obtained.

As shown in FIG. 11, when the signal RQ0 becomes "1" at a timing of the clock signal $\phi 2$, the transfer request signal RQ1 which is outputted from the latch circuit 441 at a timing of the next clock signal $\phi 1$ becomes "1", and the transfer request signal RQ2 of the latch circuit 442 becomes "1" at a timing of the next clock signal $\phi 2$. Thus, the transfer control signals RQ1–RQ4 become "1" sequentially. Then, the latch signals CK1–CK4 are enabled until the transfer control signal RQ4 from the latch circuit 444 becomes "1".

At a timing of the next clock signal $\phi 1$ after the transfer control signal RQ4 becomes "1", that is, at a time t1 shown in FIG. 11, since the acknowledge signal AKI does not become "1", at this time point, the output of the exclusive NOR gate E4 becomes "0" and the latch signal CK3 becomes an inhibit state. Furthermore, at a timing of the next clock signal $\phi 1$, the output of the exclusive NOR gate E2 becomes "0" and the latch signal CK2 becomes an inhibit state. Thus, the latch signals CK become the inhibit states sequentially in a direction from the latch circuits of prestages to the latch circuits of poststages, resultingly, the transfer of the packets are sequentially stopped in the data transfer line using such a self-synchronous shift register 42.

In addition, if the acknowledge signal AKI becomes "1" at a time t2 shown in FIG. 11, for example, the output of the exclusive NOR gate E4 immediately returns to "1" and the latch signal CK4 is enabled. At a timing of the next clock signal $\phi 2$, the output of the exclusive NOR gate E3 becomes "1" and the latch signal CK3 is enabled. Thus, the latch signals are sequentially enabled in a direction from the latch circuits at prestages to the latch circuits at poststages, resultingly, the stopped states in the data transfer line are sequentially released.

If the data transfer line is constructed by using the self-synchronous shift register 42 in FIG. 10 embodiment, in such a data transfer line, the packets can be elastically transferred word by word. Therefore, even if the number of words of the packets is varied, it is possible to transfer the data so as to flexibly deal with such a variation while the transfer is stopped and the stop is released.

In addition, as shown in FIG. 3D or 3E, the transfer control bit RQ being held within the packet in advance plays a role of a request signal for a latch circuit of the next stage as well as a role of an acknowledge signal inputted to a latch circuit of the succeeding stage. Therefore, in the self-synchronous shift register 42 shown in FIG. 10, a hardware becomes necessary other than a latch circuit 44 is only a 1-bit flip-flop (or latch) and a comparing gate (exclusive NOR gate), and therefore, a hardware construction is very simple.

Furthermore, the parallel computer of the above described embodiment has a wide varieties of applications, and therefore, the most suitable system scale, a network formation for such a variety of applications and a computing cost capable of being permitted are requested. However, it becomes very large load to re-design a hardware to be suitable hardware whenever such a system scale (the number of processing elements) and a network formation are changed. Therefore, in FIG. 12 embodiment, a network and size judgment unit (NSJ) 44 is provided in the NC 18 (FIG. 2) so as to easily change a system size and a network formation. In a case where this embodiment is applied to, as shown by a dotted line in FIG. 1, data SIZE-X indicative of a row direction size (the number of processing elements), data SIZE-Y indicative of a column direction size (the number of processing elements) and a network mode signal NMC are applied from the host computer 12 to the respective processing elements. The NSJ 44 shown in FIG. 12 includes a subtracter 44, and the PE number X(Y) of an addressed processing element included in the packet is inputted to an input A of the subtracter 46 and the PE number x(y) of a processing element including the NSJ 44 is inputted to an input B of the subtracter 46. A subtraction result of "A-B" is outputted from the subtracter 46, which is inputted to a NOR gate 48 and inputs I1–I5 of a multiplexer 50. Outputs of three OR gates 521–523 are applied to S0–S2 of the multiplexer 50 as control codes therefor. The signal NMC is given to respective one input of the OR gates 521–523 and, the other inputs thereof, respective bits of the data SIZE-X of the number of processing elements of the row direction (the data SIZE-Y of the number of processing elements of the column direction) are applied. The multiplexer 50 selectively takes out any one of the inputs I0–I7 in response to states of the control code S0–S2. For such a multiplexer, a suitable LSI on the market may be used.

In addition, the above described data SIZE-X and SIZE-Y and the signal NMC are shown in the next tables VI, VII, and VIII.

TABLE VI

| SIZE-X | Number of processing elements of row direction | |
|---|---|---|
| 0 0 0 | 1 | $(2^0)$ |
| 0 0 1 | 2 | $(2^1)$ |
| 0 1 0 | 4 | $(2^2)$ |
| 0 1 1 | 8 | $(2^3)$ |
| 1 0 0 | 16 | $(2^4)$ |
| 1 0 1 | 32 | $(2^5)$ |

TABLE VII

| SIZE-Y | Number of processing elements of column direction | |
|---|---|---|
| 0 0 0 | 1 | $(2^0)$ |
| 0 0 1 | 2 | $(2^1)$ |
| 0 1 0 | 4 | $(2^2)$ |
| 0 1 1 | 8 | $(2^3)$ |
| 1 0 0 | 16 | $(2^4)$ |
| 1 0 1 | 32 | $(2^5)$ |

TABLE VIII

| NMC | Mode for routing |
|---|---|
| 0 | Torus mesh mode |
| 1 | Non-torus mesh mode |

As clearly understood from the table VIII, the signal NMC becomes "1" in a case of the non-torus mesh mode. Therefore, the control code S0–S2 of the multiplexer 50 becomes "111", and therefore, the multiplexer 50 always selects a carry C of the output of the subtracter 46 as sign bits of the differences Δx and Δy between the addressed PE number and its own PE number described with reference to FIG. 7 previously.

On the other hand, in a case of the torus mesh mode, the signal NMC becomes "0", and the control code S0–S2 of the multiplexer 50 is the data SIZE-X (SIZE-Y), and therefore, the multiplexer 50 selects the upper bit, the larger size as the sign bits of Δx and Δy.

In addition, when the packet is arrived at the addressed processing element, since the output of the subtracter 46 becomes "00000", the output of the NOR gate 48 becomes "1". Therefore, the NOR gate 48 detects a coincidence of the PE numbers.

Figure 12:
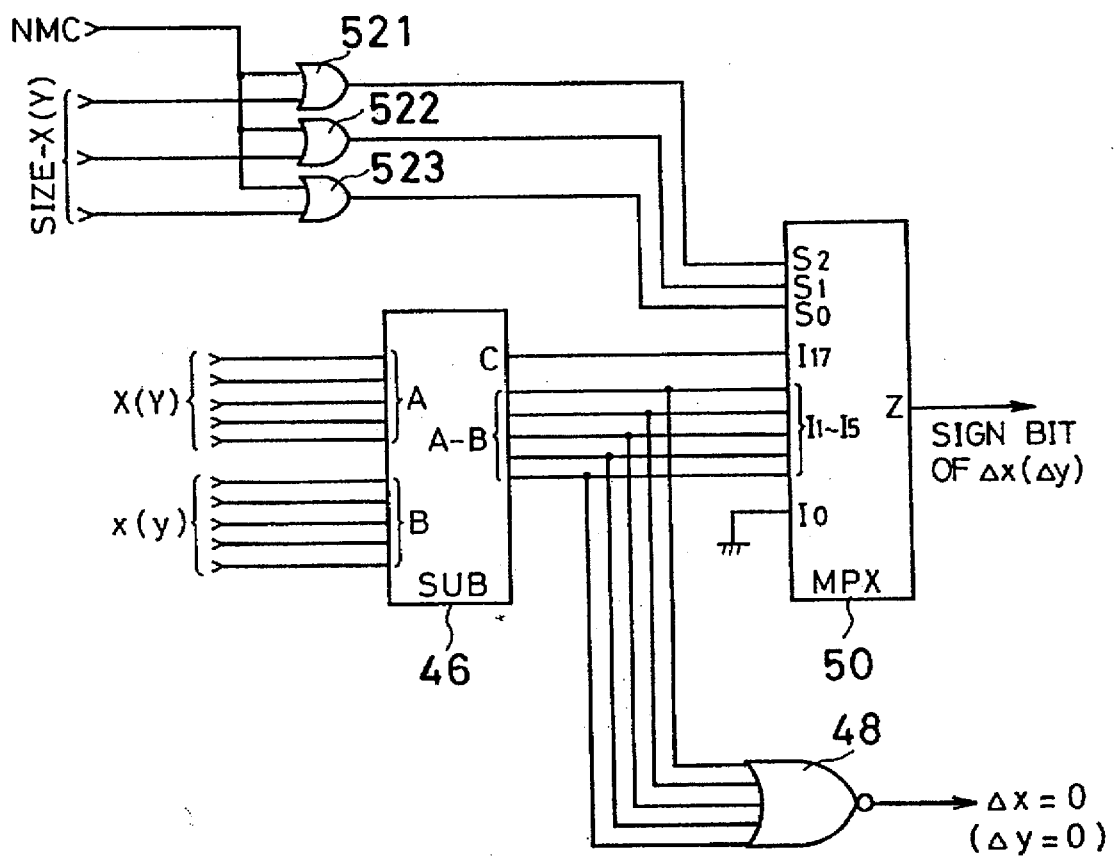
FIG. 12 is a circuit diagram showing one example of a network and size judgment unit (NSJ) included in a network control unit shown in FIG. 2.

In accordance with FIG. 12 embodiment, in a case where the respective processing elements PE are arranged in the torus mesh network shown in FIG. 1, it is possible to change the number of processing elements n and m in the row direction and the column direction as "1", "2", "4", "8", "16", "32", ... , respectively. In addition, even in a case of not the torus mesh network but the non-torus mesh network, the packet can be always transferred with the shortest distance.

FIGS. 13–18 shows a specific embodiment of the EXE 26 and the VC 38 of the above described embodiment. The data driven computer is better than a Neumann type computer in indefinite operations; however, the same has a disadvantage in accordance with a characteristic thereof that a processing rate is slower than that of Neumann type computer with respect to repeat of definite and simple operations such as vector inner products. The embodiment shown in FIGS. 13–18 is directed to increase processing performance in vector operations.

Figure 13:
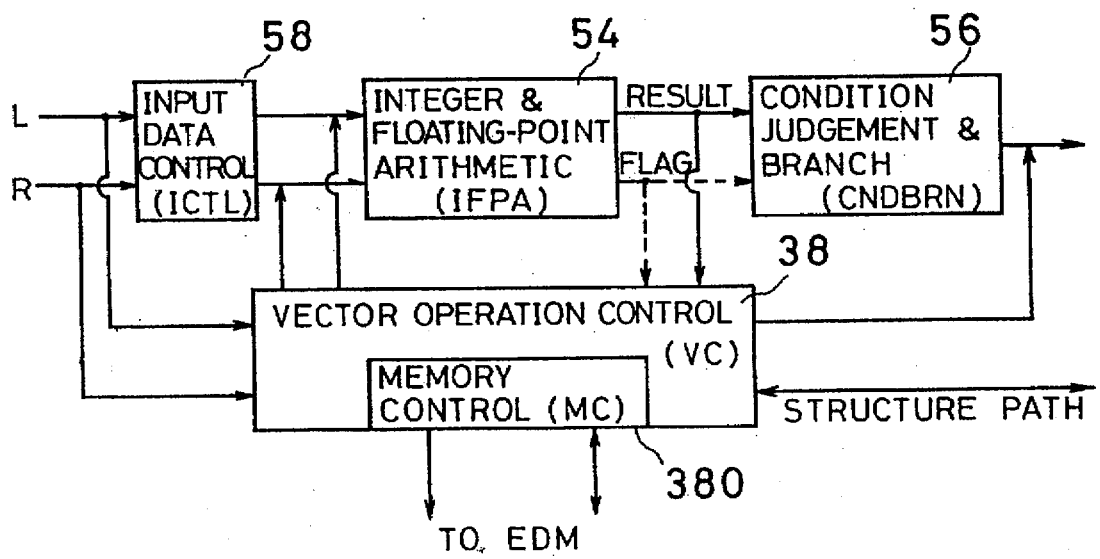
FIG. 13 is a block diagram showing details of an execution unit (EXE) and a vector operation control unit (VC) shown in FIG. 2.

The EXE 26 shown in FIG. 13 is coupled to the VC 38. In the EXE 26, when the operation packet holding a code indicative of instruction execution is arrived at, a process designated by the main operation code OPECODE-M held in the packet and the sub-operation code OPECODE-S is executed. The main operation code OPECODE-M defines a process in an integer and floating point arithmetic unit (IFPA) 54 and the sub-operation code OPECODE-S defines processes in a condition judgment and branching unit (CNDBRN) 56 and the VC 38. An input data control unit (ICT) 58 prepares data from the FCCM 24 (FIG. 2) in the front stage of the EXE 26, data read from the EDM 40 (FIG.

2) under the control by a memory control unit (MC) 380 of the VC 38 and simplified constant data generated based upon the sub-operation code OPECODE-S as input data to the IFPA 54.

The CNDBRN 56 judges truth of a condition designated by the sub-operation code OPECODE-S to process the branch or the like. The VC 38 performs a control for successively processing the vector operation designated by the main operation code OPECODE-M in a form designated by the sub-operation code OPECODE-S. As the operation instruction of the IFPA 54, there are a logical operation of 32-bit integers, addition, subtraction, multiplication, integer/real number conversion or the like.

The operation instruction is executed by the IFPA 54. Read and operation instructions or constant generation and operation instructions are executed by the ICTL 58 and IFPA 54. Operation and condition judgment/branch instructions are executed by the IFPA 54 and the CNDBRN 56. The vector operation instruction and the memory access instruction are executed by the IFPA 54 and the VC 38.

Figure 14:
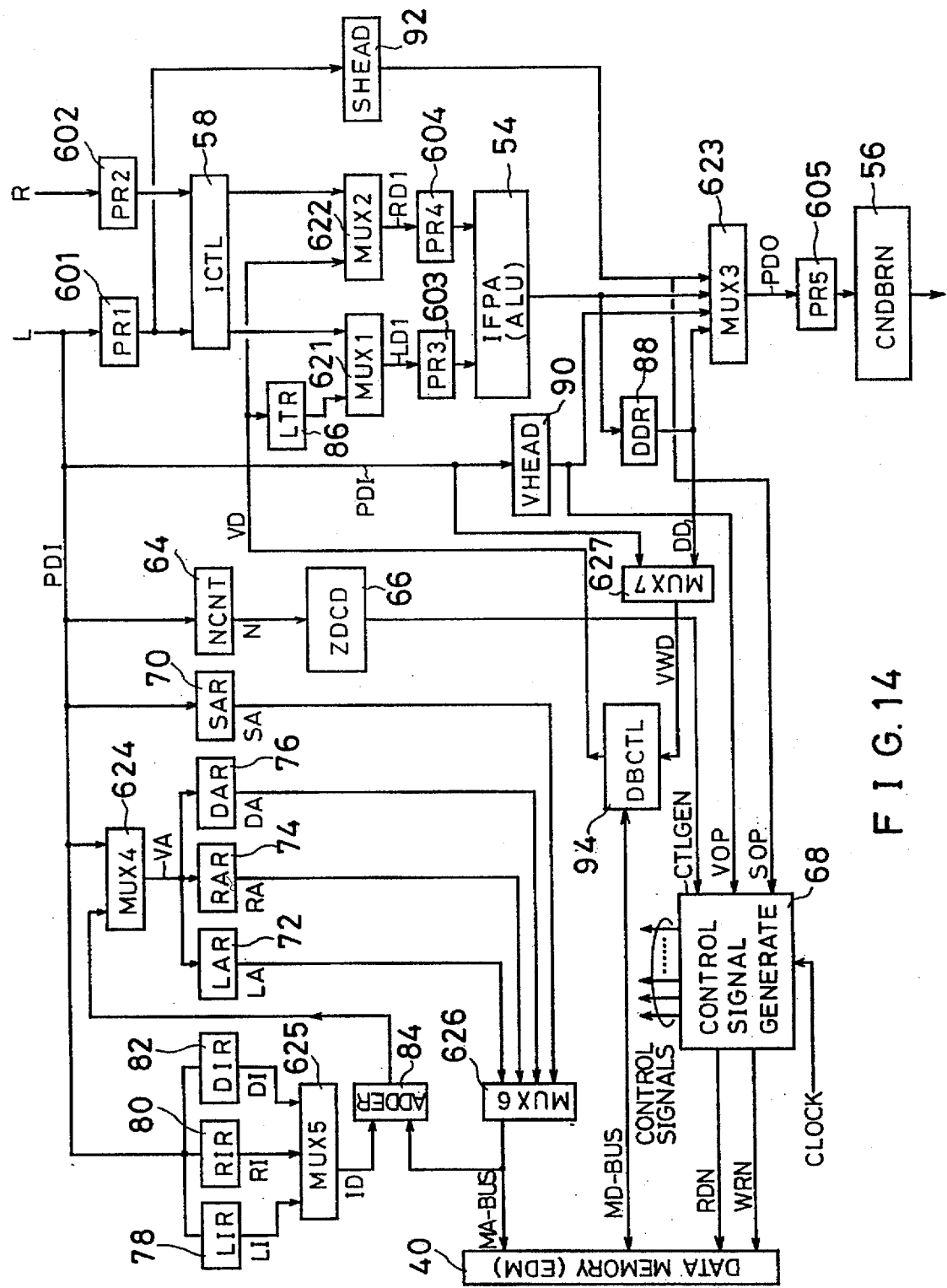
FIG. 14 is a block diagram showing a vector operation control unit of the FIG. 13 embodiment in more detail.

A detail circuit of the VC 38 shown in FIG. 13 is shown in FIG. 14. At a front stage of the ICTL 58 shown in FIG. 13, pipeline registers (PR1 and PR2) 601 and 602 are connected, to which the left operand (L) and the right operand (R) from the FCCM 24 (FIG. 2) are loaded. In the ICTL 58, processes such as an exchange of the left operand and the right operand and a copy the left operand to the right operand are performed. Outputs of the ICTL 58 is loaded to the PR3 603 and PR4 604 through multiplexers (MUX1 and MUX2) 621 and 622. An arithmetic logic unit (ALU), that is, the IFPA 54 of FIG. 13 performs an arithmetic logic operation of the operands loaded to the PR3 603 and PR4 604. An output of the IFPA 54 is applied to the CNDBRN 56 through the MUX3 623 and the PR5 605.

A vector operation counter (NCNT) 64 is set by a register setting instruction included in the operand and decremented by "−1" at every timing when an operation is executed once in executing the vector operation. A counted value of the NCNT 64 is given to a zero determination circuit (ZDCD) 66 which determines whether or not the NCNT 64 becomes "0". An output of the ZDCD 66 is given to a control signal generator 68.

A scalar address register (SAR) 70 holds a memory address when a memory read/write instruction is executed in accordance with a normal packet or when a load/dump instruction is executed. An output of the SAR 70 is given to the MUX6 626 together with outputs of a left operand address register (LAR) 72, a right operand address register (RAR) 74 and a result operand address register (DAR) 76. The LAR 72 holds a left operand address given through the MUX4 624. That is, an initial value is set in the LAR 72 by a register setting instruction, and when the vector operation is to be executed, the LAR 72 is renewed at every timing when the read of one operand is completed. As similar to the LAR 72, the RAR 74 holds an initial value of an address for a right operand, which is renewed at every timing when the read of one operand is completed in executing the vector operation. The DAR 76 holds an address initial value which is renewed at every timing when the read of one result operand is completed.

The multiplexer MUX5 625 selects outputs of a left operand address difference register (LIR) 78, a right operand address difference register (RIR) 80 and a result operand address difference register (DIR) 82 to apply to an adder (ADDER) 84. To the other input of the ADDER 84, the output of the MUX6 626 is applied. Then, an output of the ADDER 84 is applied to the MUX4 624 together with the initial value data of the LAR 72, RAR 74 and DAR 76. The LIR 78 outputs an address difference value for renewing the LAR 72 in executing the vector operation. As similar thereto, the RIR 80 outputs an address difference value for the right operand in executing the vector operation. The DIR 82 also outputs an address difference value with respect to the result operand.

In executing the vector operation, a left operand temporary register (LTR) 86 temporarily holds the left operand data as previously read. In executing the vector operation, a result data register (DDR) 88 holds an operation result for each unit operation.

A register (VHEAD) 90 holds information of the header of a vector operation instruction packet and a register (SHEAD) 92 holds information of the header of a normal instruction packet. Then, outputs of the VHEAD 90 and SHEAD 92 are inputted to the MUX3 623.

To the MUX7 627, the left operand and an output of the DDR 88 are inputted and an output of the MUX7 627 is given to a data bus control circuit (DBCTL) 94. The DBCTL 94 changes a data transfer direction of a memory data bus MD-BUS which is a bi-directional bus. More specifically, in reading the memory, the vector operation operand data VD (FIG. 18) of the memory data bus MD-BUS is outputted to the IFPA 54 and, in writing the memory, memory writing data VWD (FIG. 18) is outputted toward the memory data bus MD-BUS. In addition, in a case where a content of the DDR 88 is used as an operand for next operation, a value of the memory writing data VWD is given to the IFPA 54 as the vector operation operand data VD.

Figure 18:
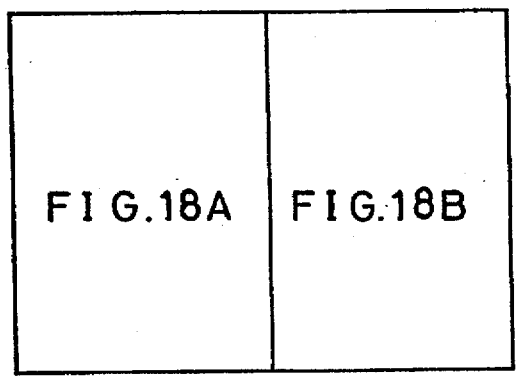
FIG. 18 shows FIGS. 18A and 18B, which are timing chart showing a time-shared operation of a scalar operation and a vector operation in FIG. 14 embodiment.

From the control signal generator 36, necessary control signals shown in FIG. 18 are generated to control respective multiplexers, IFPA 54, ADDER 84, DBCTL 94 and etc.

In addition, in FIG. 14, the reference symbols PDI and PDO shows an input packet and an output packet, respectively. In addition, the reference symbol MA-BUS shows a memory address bus.

Next, with reference to FIGS. 15A–15E, an operation of the embodiment shown in FIGS. 13 and 14 will be described.

Load initial value data to EDM

In a case where for a vector operation, respective elements $x_0, x_1, \ldots, x_n$ of an n+1-dimension vector X and respective elements $y_0, y_1, \ldots, y_n$ of an n+1-dimension vector Y are stored in the EDM 40, an inputted load packet has a format shown in FIG. 15A, for example. The data held in the field ADDRESS of the first word, that is, the header of the packet is outputted to the memory address bus MA-BUS through the PDI line, SAR 70, a scalar address (SA) line and the MUX6 626. The data held in the field DATA of the second word, that is, the tail is outputted to the memory data bus MD-BUS through the PDI line, the MUX7 627, a memory write data line VWD and the DBCTL 94. In response thereto, a data write signal WRN becomes "0" and the data included in the load packet is written in the EDM 40. By repeating such a writing operation, as shown in FIG. 16, the EDM 40 is loaded with the initial values. In addition, FIG. 17 shows a memory format of the EDM 40 after the vector operation.

Execution of vector operation

When a vector operation of "X+Y" is executed with respect to respective elements of the vectors X and Y being loaded to the EDM 40 as shown in FIG. 16, a register value setting instruction packet as shown in FIG. 15B is used. An operation code, that is, the header b is inputted to the control signal generating circuit 68 from the PR1 601 via the SHEAD 92 for the normal instruction packet and a normal operation code (SOP) line. With respect to the packet of FIG. 15B, the operation code written in the first word, that is, the header b is decoded by the control signal generator 68 to determine a register to be set.

On the other hand, a register setting data included in the second word is outputted as a vector address VA via the PDI line and the MUX4 624. Thereafter, under a control of the control signal generator 68, a latch signal for a predetermined register is outputted and the register setting data of FIG. 15B is outputted to the register. More specifically, in accordance with a memory format shown in FIG. 17, an address XA0 is set in the LAR 72, an address YA0 is set in the RAR 74 and an address ZA0 is set in the DAR 76. Then, difference values "1" are set in the LIR 78, RIR 80 and DIR 82, respectively.

In a vector operation packet shown in FIG. 15C, an operation code indicative of a vector addition "X+Y" is written in the first word (the header c) and "n" (=vector length, i.e. the number of times of the vector operations–1) is held in the second word (the tail).

When such a vector operation packet is inputted, the vector operation is started in accordance with the values of the LAR 72, RAR 74 and DAR 76, and LIR 78, RIR 80 and DIR 82 at that timing. In addition, the data n is held as an input packet PDI in the NCNT 64 when the vector operation is started. Thus, in response to a control signal from the control signal generator 68, an addition operation for the vector elements $x_0$ and $y_0$ read from the EDM 40 is executed in the IFPA 54. Thereafter, such an addition operation is repeated to sequentially execute the vector operation up to the vector elements $x_n+y_n$, and results thereof are sequentially stored in the EDM 40 as shown in FIG. 17.

Thus, in executing the vector operation, the vector elements read from the EDM 40 are succeedingly applied to the IFPA 54, and therefore, a rapid process of the vector operation that was difficult to be implemented in the conventional data-driven data processing apparatus can be implemented.

Execution of scalar operation

On the other hand, in a case of a scalar operation executed in accordance with a normal data flow graph, a normal operation packet shown in FIG. 15D is used. The operation packet is obtained from the FCCM 24 (FIG. 2) "x" indicative of multiplication is held as an operation code in the first word (the header d) of the packet shown in FIG. 15D, and a left operand sdx1 and a right operand sdy1 are held in the second word, that is, the tail. In addition, in another normal operation packet shown in FIG. 15E, "–" indicative of subtraction is held as an operation code in the first word, that is, the header e, and as similar to that of FIG. 15D, a left operand sdx2 and a right operand sdy2 are held in the second word.

When the instruction packet for a scalar operation shown in FIGS. 15D and 15E are inputted, the left operand is inputted to the IFPA 54 through the PR1 601, ICTL 58, MUX1 621, a left operand data (LD1) line and the PR3 603. On the other hand, the right operand is inputted to the IFPA 54 through the PR2 602, ICTL 58, MUX2 622, a right operand data (RD1) line and the PR4 604. Therefore, in the IFPA 54, a predetermined operation is executed, and result data is outputted as an output packet data PDO via the MUX3 603.

In addition, the first word, that is, the header of the packet is temporarily stored in the SHEAD 92 via the PR1 601, and thereafter, outputted as output packet data PDO through the MUX3 623. The output packet PDO are constructed as 2-word packet in which a content of the above described SHEAD 92 is held as it is in the first word and the result data is held is the second word.

Execution of vector operation and scalar operation

With reference to FIG. 18, a description will be made on a time-sharing parallel process of an vector operation and a scalar operation in a case where the packets shown in FIGS. 15C–15E are successively sent from the FCCM 24. In addition, as previously described, after the load of the initial packet shown in FIG. 15A to the EXE 40, the initial values are set in the LAR 72, RAR 74, DAR 76, LIR 78, RIR 80 and DIR 82 by the setting packet shown in FIG. 15B.

Figure 18A:
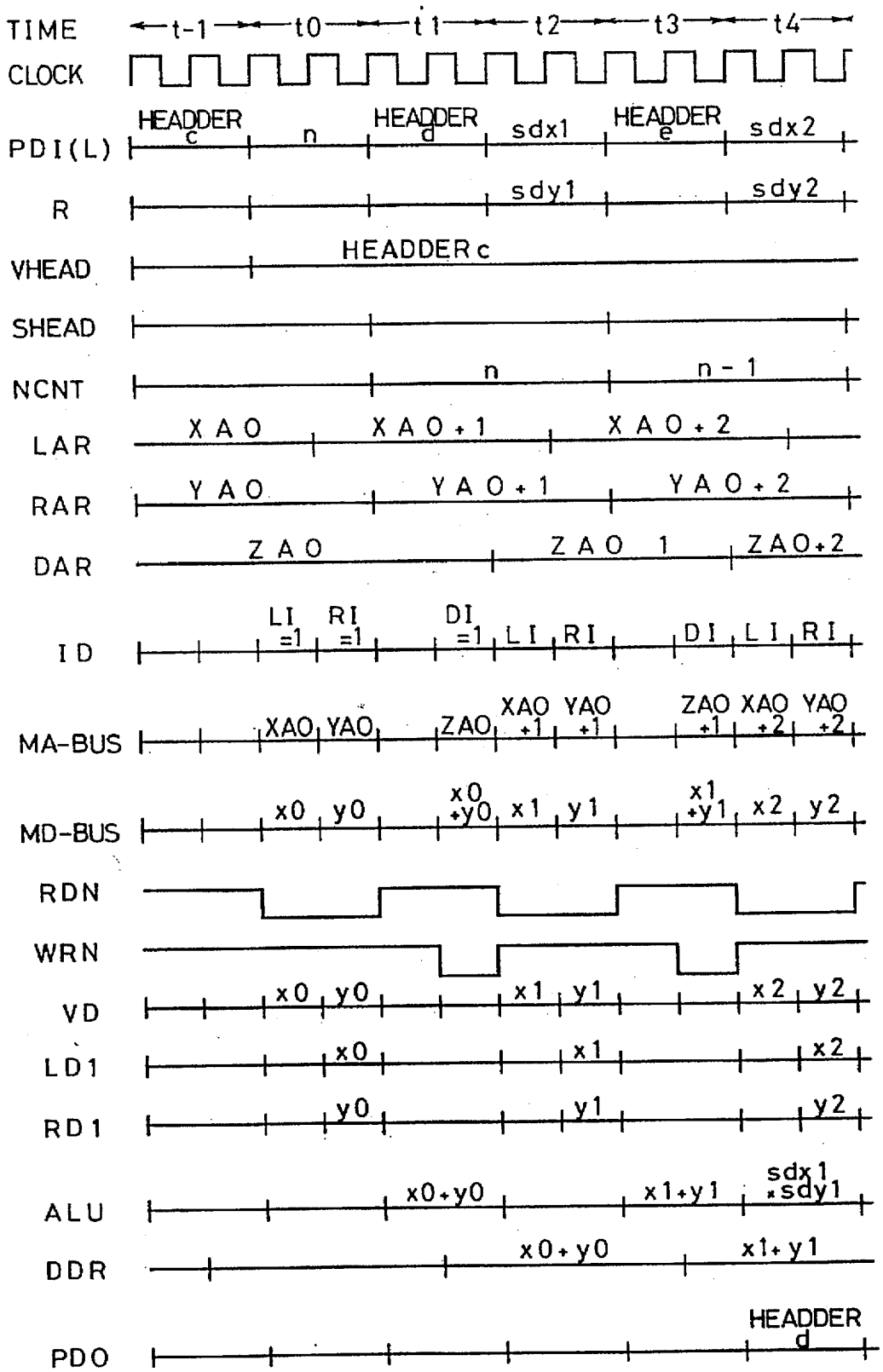
Figure 18B:
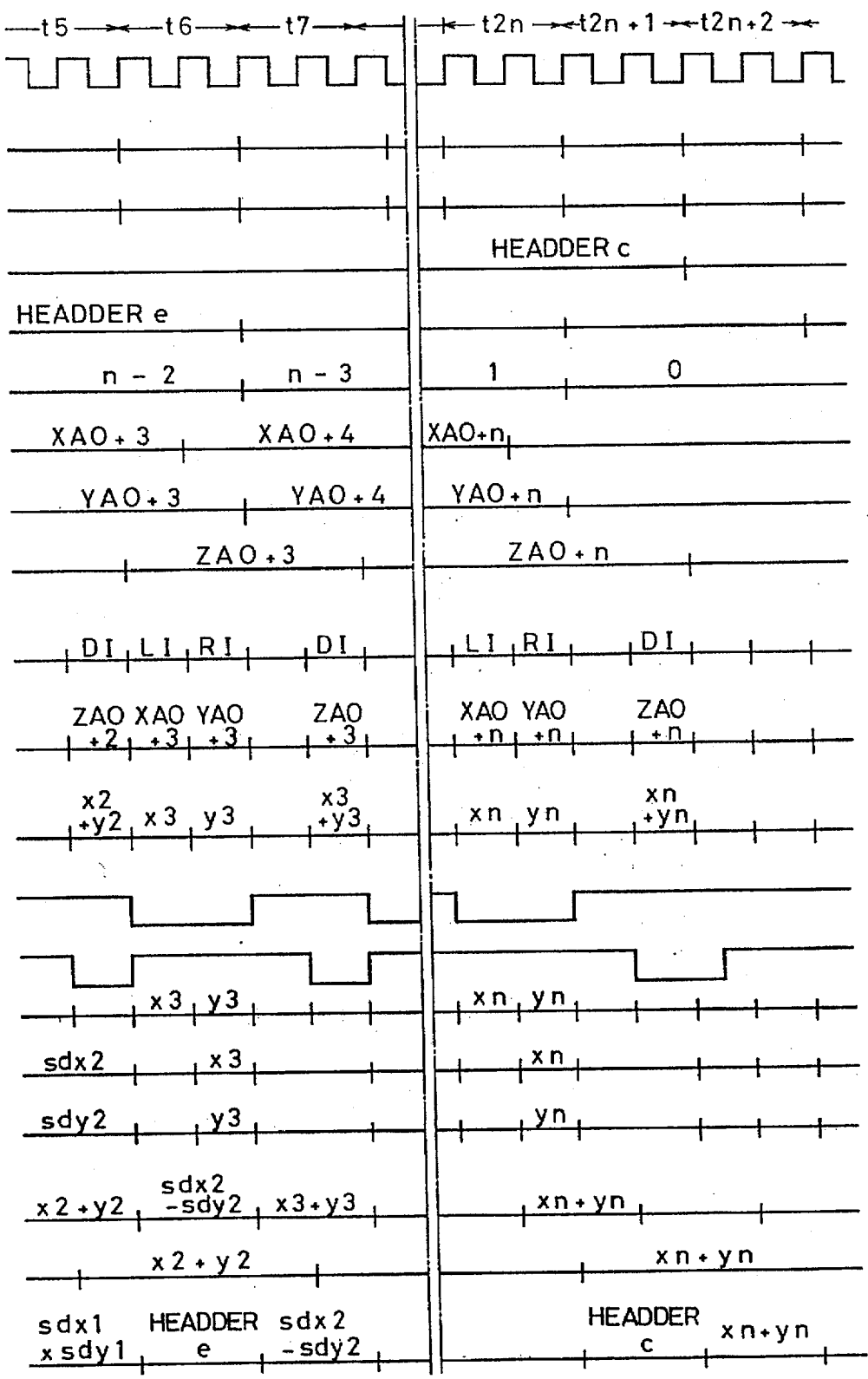

When the vector operation packet shown in FIG. 15C is entered at a time t–1 of FIG. 18 (FIG. 18A), the IFPA 54 executes the addition of the first elements "$x_0+y_0=z_0$" of the vector operation at a time t1, and at each odd times t3, t5, . . ., addition of succeeding elements "$x_1+y_1=z_1$", "$x_2+y_2=z_2$", . . . are sequentially executed. In the IFPA 54, a scalar operation of a normal data driven type, for example, a 2-term operation such as an addition or multiplication is executed at even times under an inherent condition of the data-driven type. For example, with respect to the scalar operation packet which is entered at the time t1 and shown in FIG. 15D, at a time t4, the IFPA 54 operates "sdx1×sdy1", and a result thereof appears on the PDO line at a time t5, and is outputted at a time t6. With respect to the scalar operation packet which is entered at a succeeding time t3 and shown in FIG. 15E, at the time t6, the IFPA 54 executes "sdx2–sdy2", and a result thereof appears on the PDO line at a time t7 and is outputted at a time t8. A packet indicative of a completion of a vector operation is outputted as an output packet PDO at times t2n+1, t2n+2, . . .

Thus, the scalar operation and the vector operation are processed in a time-shared manner without no waiting time as such that the operations are simultaneously executed. Therefore, when a program in which the vector operation packet and the normal operation packet are mixed to be entered to the EXE 26 is executed, the IFPA 54 efficiently operates without rest, and therefore, operation efficiency is increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel computer system comprising:
   a plurality of processing elements, each of said processing elements including
      a network control unit having a plurality of individual communication ports,
      a data processing unit, and
      a mode flag capable of being selectively set for operating the processing element in a first number setting mode or a second normal operation mode,
   each said network control unit receiving data sets that each contain a processing element identifying number and performing a transfer control of the received data sets;
   a plurality of individual communication lines for coupling the plurality of individual communication ports of said network control units of said plurality of processing elements into a network;
   sending means for sequentially sending the data sets onto said network, said sending means sending each data set with a different processing element identifying number while any of said processing elements are in said first number setting mode;

holding means in each of said plurality of processing elements for holding a respective processing element identifying number corresponding to each said processing element as received in a data set from said sending unit; and number setting means in each of said plurality of processing elements for setting said processing element identifying number, wherein each of the network control units, (i) while its respective processing element is in said first number setting mode, transfers each received data set to its own processing element irrespective of the processing element identifying number contained in the received data set arriving at any one of said plurality of communication ports of a said processing element, (ii) while said own processing element is in said second normal mode transfers the received data set to said own processing element only when the processing element identifying number contained in the data set is equal to the processing element identifying number held by said own processing element, and (iii) while a said processing element is in said second normal mode and at a time when the processing element identifying number contained in the received data set is not equal to the respective processing element identifying number held by its own processing element, transfers the data set to a selected one of said plurality of communication ports of the processing element, and means in each of said processing elements for setting the mode flag in said normal operation mode when said processing element identifying number is held by said holding means.

2. A parallel computer system in accordance with claim 1, further comprising mode indicating means in each of said plurality of processing elements for indicating which of said first number setting mode and said second normal operation mode is set; said number setting means recognizing with reference to said mode indicating means that said processing element is set in said first number setting mode.

3. A parallel computer system in accordance with claim 2, further comprising means for forcing said mode indicating means to be in a state indicating said first number setting mode.

4. A parallel computer system in accordance with claim 3, wherein said forcing means includes a host computer coupled to said network.

5. A parallel computer system in accordance with claim 3, further comprising means for changing said mode indicating means into a state indicating said second normal operation mode when said processing element identifying number is set in said number holding means.

6. A parallel computer system in accordance with claim 1, further comprising means for detecting coincidence of non-coincidence of the processing element identifying number included in the data set received at said network control unit with the processing element identifying number held in a said processing element number holding means.

7. A parallel computer system in accordance with claim 6, further comprising first means provided in said network control unit for inputting said data sets as received to said data processing unit when said coincident detection means detects coincidence.

8. A parallel computer system in accordance with claim 7, further comprising second means provided in said network control unit for transferring said data sets as received to an adjacent processing element when said coincidence detection means detects non-coincidence.

9. A parallel computer system in accordance with claim 8, wherein second means transfers said data sets as received to any one of said plurality of communication ports of said network control unit determined in accordance with a predetermined algorithm.

10. A parallel computer system in accordance with claim 9, wherein said data sets as received include an addressed processing element number indicating that said data set is to be received by a particular processing element, and said network control unit includes routing means for selecting one of said plurality of communication ports based on said addressed processing element number and the processing element identifying number held in said number holding means so that said data can be transferred to the processing element corresponding to said addressed processing element number with the shortest distance routing.

11. A parallel computer system in accordance with claim 10, wherein said routing means includes means for operating on the difference between said addressed processing element number and said processing element identifying number held in said number holding means.

12. A parallel computer system in accordance with claim 11, wherein said communication lines connect the network control units to each other to arrange said plurality of processing elements in a mesh network, and said processing element identifying number for a processing element is composed of a row direction number and a column direction number, and said means for operating on the difference includes means for operating on the difference of said row direction number and means for operating on the difference of said column direction number.

13. A parallel computer system in accordance with claim 12, wherein said network control unit includes four ports, and said communication lines connect the network control units to each other to arrange said plurality of processing elements in a torus mesh network, and said means for operating on the difference of said row direction numbers and means for operating on the difference of said column direction numbers include modulo computing means, respectively.

14. A parallel computer system in accordance with claim 6, wherein data sets transferred on said communication lines includes an identification code,, said identification code representing that said data set is a first data to be transferred outside of said network or that said data set is a second data to be processed inside said network, and said network control unit includes means for determining said first data or said second data with reference to said identification code.

15. A parallel computer system in accordance with claim 14, further comprising means for inputting said second data to said data processing unit when said coincidence detection means detects the coincidence of the two processing element identifying numbers and said determining means determines said second data.

16. A parallel computer system in accordance with claim 15, further comprising third means for transferring said first data onto said communication line when said coincidence detection means detects the coincidence of the two processing element numbers and said determining means determines said first data.

17. A parallel computer system in accordance with claim 16, wherein said network control unit includes a plurality of communication ports, and said third means transfers said first data to any one of said plurality of communication ports determined in accordance with the predetermined algorithm.

18. A parallel computer system in accordance with claim 9, wherein data sets transferred on said communication lines includes an identification code, said identification code representing that said data set is a first data to be transferred outside of said network or that said data set is a second data to be processed inside said network, and said network control unit includes means for determining said first data or said second data with reference to said identification code, said first data includes an addressed processing element identifying number indicating that said first data is to be received by which processing element, and said network control unit includes routing means for selecting one of said plurality of communication ports based on said addressed processing element identifying number and said processing element identifying number held in said number holding means so that said first data can be transferred to the processing element having said addressed processing element identifying number with the shortest distance routing.

19. A parallel computer system in accordance with claim 18, wherein said data sets as received include an addressed processing element number indicating that said data set is to be received by a particular processing element, and said network control unit includes routing means for selecting one of said plurality of communication ports based on said addressed processing element number and the processing element identifying number held in said number holding means so that said data can be transferred to the processing element corresponding to said addressed processing element number with the shortest distance routing, said routing means includes means for operating on the difference between said addressed processing element number and said processing element number held in said number holding means.

20. A parallel computer system in accordance with claim 19, wherein said communication lines connect the network control units to each other to arrange said plurality of processing elements in a mesh network, and said processing element identifying number for a processing element is composed of a row direction number and a column direction number, and said means for operating on the difference includes means for operating on the difference of said row direction numbers and means for operating on the difference of said column direction numbers.

21. A parallel computer system in accordance with claim 20, wherein said network control unit includes four ports, said communication lines connect the network control unit to each other to arrange said plurality of processing elements in a torus mesh network, and said means for operating on the difference of said row direction numbers and means for operating on the difference of said column direction numbers include modulo computing means, respectively.

22. A parallel computer system in accordance with claim 1, further comprising a host computer coupled to said network; and an interface inserted in said communication line and coupled to said host computer, wherein said data sets include an identification code, said identification code representing that said data is a first data to be transferred to said host computer or that said data is a second data to be processed inside said network, and said interface includes means for determining said first data or said second data with reference to said identification code, and means for transferring said first data to said host computer when said determining means determines said first data and means for outputting said second data to said communication line when said determining means determines said second data.

23. A parallel computer system in accordance with claim 22, wherein said network control unit includes four ports, and said communication line includes a row direction communication line and a column direction communication line to arrange said plurality of processing element in a torus mesh network, and said interface is located in at least one of said row direction communication line and said column direction communication line.

24. A parallel computer system in accordance with claim 23, wherein data transferred on said row direction communication line and said column direction communication line includes an identification code, said identification code representing that the data is a first data to be transferred to said host computer or that the data is a second data to be processed inside said torus mesh network; and said interface includes means for determining said first data or said second data with reference to said identification code.

25. A parallel computer system in accordance with claim 22, wherein said data set includes a processing element number of said addressed processing element and each of said plurality of processing elements includes number holding means for holding its own processing element identifying number, and said network control units include routing means which include means for operating on the difference between said addressed processing element number and said own processing element identifying number held in said number holding means.

26. A parallel computer system in accordance with claim 24, wherein said interface includes means for outputting said second data set to said row direction communication line or said column direction communication line when said determining means determines that the data is said second data.

27. A parallel computer system in accordance with claim 26, wherein said interface includes a plurality of communication ports and said outputting means outputs said second data to any one of said plurality of communication ports determined in accordance with a predetermined algorithm.

28. A parallel computer system in accordance with claim 27, wherein said second data set includes an addressed processing element number indicative that said second data set is to be received at a particular processing element, said interface includes routing means for selecting one of said plurality of communication ports based on said addressed processing element number and said processing element identifying number held in said number holding means so that said second data set can be transferred to the processing element having said addressed processing element number with the shortest distance routing.

29. A parallel computer system in accordance with claim 28, wherein said routing means includes means for operating on the difference between said addressed processing element number and said processing element identifying number held in said number holding means.

30. A parallel computer system in accordance with claim 29, wherein said processing element identifying number is composed of a row direction number and a column direction number, and said means for operating on the difference includes means for operating on the difference of said row direction numbers and means for operating on the difference of said column direction numbers.

31. A parallel computer system in accordance with claim 30, wherein said means for operating on the difference of said row direction numbers and means for operating on the difference of said column direction numbers include modulo computing means, respectively.

32. A parallel computer system in accordance with claim 27, wherein said second data includes an addressed processing element number indicative that said second data is to be received by a particular processing element, and said interface includes range judgment means for judging whether said addressed processing element number exists within a predetermined range, and means for selecting a different port in accordance with the judgment of said range judgment means.

33. A parallel computer system in accordance with claim 32, wherein said interface includes a row direction port and a column direction port, and said means for selecting a different port selects a said row direction port or a said column direction port.

34. A parallel computer system in accordance with claim 22, wherein each of said plurality of processing elements and said interface are formed on the same LSI, said LSI being capable of being selectively set in a processor mode in which said LSI operates as said processing element or an interface mode in which said LSI operates as said interface.

35. A parallel computer system in accordance with claim 34, wherein said host computer outputs a signal for setting said processor mode or said interface mode to said LSI, and said LSI is set to a mode dependent on said signal.

36. A parallel computer system in accordance with claim 22, wherein said host computer sends a size data indicative of a size of said network to said plurality of processing elements, and each of said plurality of processing elements includes routing means for determining the shortest distance path in transferring the data to an adjacent processing element based upon said size data.

37. A parallel computer system in accordance with claim 36, wherein data to be transferred to said adjacent processing element includes a number of an addressed processing element, and said routing means includes subtracting means for subtracting said number of said addressed processing element and said processing element number held in said number holding means for outputting subtraction result data of a plurality of bits so that said shortest distance path is determined based upon values of different bits of said subtraction result data of said subtracting means.

38. A parallel computer system in accordance with claim 37, wherein said host computer sends formation data indicative of formation of said network to said plurality of processing elements, wherein said routing means in each of said processing elements includes means for modifying said size data in accordance with said formation data.

39. A parallel computer system in accordance with claim 25, wherein said communication lines connect the network control units to each other to arrange said plurality of processing elements in a mesh network, and said processing element identifying number is composed of a row direction number and a column direction number, and said means for operating on the difference includes means for operating on the difference of said row direction numbers and means for operating on the difference of said column direction numbers.

40. A parallel computer system in accordance with claim 39, wherein said network control unit includes four ports, said communication lines connect the network control units of said processing elements to arrange said plurality of processing elements in a torus mesh network, and said means for operating on the difference of said row direction numbers and means for operating on the difference of said column direction numbers include modulo computing means, respectively.

41. A parallel computer system comprising:

a plurality of processing elements, each of said plurality of processing elements including
means for storing a number identifying the corresponding processing element,
means for holding network size data representative of the size of the network in which the plurality of processing elements are located,
a network control unit having ports, N, E, S, W, each said network control unit receiving data sets addressed to a respective destination processing element in terms of a processing element identifying number of an x (row) direction and a y (column) direction, and
a data processing unit including means for outputting and receiving data to and from said ports;

communication lines coupling the E and W ports of the respective network control units of n processing elements in the x direction and the N and S ports of m processing elements in the y direction to construct a network, the size of said network being represented by said network size data in a received data set; and each said processing element including routing means for determining, on the basis of the addressed destination processing element identifying number and said network size data in a received data set, a port from which data is to be outputted from said data processing unit and transferred to a given port of an addressed destination processing element over 'the shortest routing distance on the basis of the difference dx-x, dy-y, between the destination processing element identifying number dx, dy and identifying number x, y held in its number holding means to determine the port from which data is to be output so that the data can be transferred to the destination processing element over the shortest distance on the basis of the difference dx-x, dy-y, and the network size, the outputted data of a processing element outputting such data including the processing element identifying number of the addressed destination processing element.

42. A parallel computing system as in claim 41 wherein the routing means of each processing element further includes means which executes modulo computing to determine the difference dx-x, dy-y in accordance with the network size n, m.

43. A parallel computing system as in claim 42 wherein the routing means of each processing element determines the port from which the data is to be output in accordance with whether the result of the modulo computing of dx-x, dy-y has a code of plus or minus, or is zero.

44. A parallel computing system as in claim 42 wherein the modulo computing means computes by extracting predetermined bits of the difference dx-x, dy-y as a code bit and data bits in accordance with the network size n, m.

* * * * *